(12) United States Patent
Jin et al.

(10) Patent No.: US 10,233,363 B2
(45) Date of Patent: Mar. 19, 2019

(54) HOT MELT ADHESIVE COMPOSITION INCLUDING A CRYSTALLINE BLOCK COMPOSITE

(71) Applicant: Dow Global Technologies LLC, Midland, MI (US)

(72) Inventors: Yi Jin, Missouri City, TX (US); Kim L. Walton, Lake Jackson, TX (US); Gary R. Marchand, Gonzales, LA (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/505,485

(22) PCT Filed: Aug. 20, 2015

(86) PCT No.: PCT/US2015/046008
§ 371 (c)(1),
(2) Date: Feb. 21, 2017

(87) PCT Pub. No.: WO2016/028961
PCT Pub. Date: Feb. 25, 2016

(65) Prior Publication Data
US 2017/0247583 A1 Aug. 31, 2017

Related U.S. Application Data

(60) Provisional application No. 62/039,947, filed on Aug. 21, 2014.

(51) Int. Cl.
*C09J 153/00* (2006.01)
*C08L 23/14* (2006.01)
(Continued)

(52) U.S. Cl.
CPC ............ *C09J 123/14* (2013.01); *C08L 53/00* (2013.01); *C09J 11/06* (2013.01); *C09J 123/142* (2013.01);
(Continued)

(58) Field of Classification Search
None
See application file for complete search history.

(56) References Cited

U.S. PATENT DOCUMENTS 6,525,157 B2 * 2/2003 Cozewith .............. C08F 210/06
526/160
7,951,882 B2 5/2011 Arriola et al.
(Continued)

FOREIGN PATENT DOCUMENTS

| WO | 2012013699 A1 | 2/2012 | |
| WO | 2012068576 A2 | 5/2012 | |
| WO | WO-2014043522 A1 * | 3/2014 | ............. B32B 27/32 |

OTHER PUBLICATIONS

PCT/US2015/046008 International Search Report and Written Opinion of the International Searching Authority, dated Nov. 25, 2015.
(Continued)

*Primary Examiner* — Richard A Huhn

(57) ABSTRACT

A hot melt adhesive composition includes (A) 10-95 wt % of a random or homogeneous propylene-based interpolymer having: (i) a comonomer content of at least one of C2 and C4-10 a-olefin of 7 wt % to 49 wt % based on the total weight of the propylene-based interpolymer, (ii) an MWD of 4 or less, (iii) a density of 0.90 g/cc or less, and (iv) a Brookfield viscosity of less than 50,000 centipoise, (B) 1-60 wt % of a crystalline block composite comprising: (1) a crystalline ethylene based polymer; (2) a crystalline alpha-olefin based polymer derived from at least one of a C3-10 a-olefin; and (3) a block copolymer comprising 10-90 wt % of a crystalline ethylene block comprising greater than 90

(Continued)

mol % units derived from ethylene and comprising 10-90 wt % of a crystalline alpha-olefin block comprising greater than 90 mol % units derived from at least one of a C3-10 a-olefin, (C) Optionally, from greater than zero to 70 wt % tackifier, and (D) Optionally, from greater than zero to 40 wt % of at least one selected from the group of a wax and an oil.

8 Claims, 8 Drawing Sheets

(51) Int. Cl.
    *C09J 123/14*     (2006.01)
    *C09J 11/06*     (2006.01)
    *C08L 53/00*     (2006.01)
    *C09J 123/20*     (2006.01)

(52) U.S. Cl.
    CPC ............. *C09J 153/00* (2013.01); *C08L 23/14* (2013.01); *C08L 23/142* (2013.01); *C08L 2201/00* (2013.01); *C09J 123/20* (2013.01)

(56) References Cited

U.S. PATENT DOCUMENTS

| | | | |
|---|---|---|---|
| 9,200,185 | B2 | 12/2015 | Knutson et al. |
| 9,511,567 | B2 | 12/2016 | Hu et al. |
| 2004/0127614 | A1 | 7/2004 | Jiang et al. |
| 2005/0288412 | A1 | 12/2005 | Hohner et al. |
| 2007/0231571 | A1* | 10/2007 | Lane .................. B29C 47/0021 428/354 |
| 2011/0313106 | A1 | 12/2011 | Shan et al. |
| 2016/0075924 | A1* | 3/2016 | Takenaka ............... C09J 167/02 525/190 |

OTHER PUBLICATIONS

PCT/US2015/046008, International Preliminary Report on Patentability, dated Mar. 2, 2017.

* cited by examiner

HOT MELT ADHESIVE COMPOSITION INCLUDING A CRYSTALLINE BLOCK COMPOSITE

FIELD

Embodiments relates to hot melt adhesives (HMA) that include a crystalline block composite (CBC) compatibilizer.

INTRODUCTION

Recent developments in polymer technology have allowed for a new generation of propylene copolymer based HMAs (e.g., a hot glue that is a form of thermoplastic adhesive). However, high comonomer content (e.g., 7 or more weight percent—wt %) propylene copolymer is known to have slow crystallization rate, which leads to HMAs with long set-time. However, for fast throughput, converters desire adhesives with short set-time.

The analysis of the crystallization behavior may be conducted by utilizing differential scanning calorimetry (DSC), which can show a pronounced increase in the crystallization peak and onset temperatures. Using DSC for analysis, a first heating, a first cooling, and a second heating may be conducted. The slow crystallization rate is qualitatively characterized by the appearance of a cold crystallization peak upon the second heating in a typical DSC profile or thermogram. This may indicate that the polymer could not complete the crystallization during the prior first cooling under normal cooling rate conditions, e.g., 10 degrees Celsius per minute (° C./min). In some instances, the first cooling may take too long, which has an adverse effect on manufacturing and/or final product characteristics.

To observe a faster crystallization rate (and to enable pelletization and/or storage) the blending of ethylene copolymers or higher modulus propylene copolymers into these propylene comonomers has been proposed. However, these ethylene copolymers or higher modulus propylene copolymers provide no additional advantages with respect to nucleation (i.e., act as a nucleus for starting a crystalline formation process) of the high comonomer content propylene copolymer and often results in a stiffer than desired product. Accordingly, an effective nucleator to speed up the crystallization of this type of high comonomer content propylene copolymer is sought.

SUMMARY

Embodiments may be realized by providing a hot melt adhesive composition, comprising: (A) 10-95 wt % of a random or homogeneous propylene-based interpolymer having: (i) a comonomer content of at least one of $C_2$ and $C_{4-10}$ α-olefin of 7 wt % to 49 wt % based on the total weight of the propylene-based interpolymer, (ii) an MWD of 4 or less, (iii) a density of 0.90 g/cc or less, and (iv) a Brookfield viscosity of less than 50,000 centipoise; (B) 1-60 wt % of a crystalline block composite comprising: (1) a crystalline ethylene based polymer; (2) a crystalline alpha-olefin based polymer derived from at least one of a $C_{3-10}$ α-olefin; and (3) a block copolymer comprising 10-90 wt % of a crystalline ethylene block comprising greater than 90 mol % units derived from ethylene and comprising 10-90 wt % of a crystalline alpha-olefin block comprising greater than 90 mol % units derived from at least one of a $C_{3-10}$ α-olefin; (C) Optionally, from greater than zero to 70 wt % tackifier, and (D) Optionally, from greater than zero to 40 wt % of at least one selected from the group of a wax and an oil.

DETAILED DESCRIPTION

Figure 1:
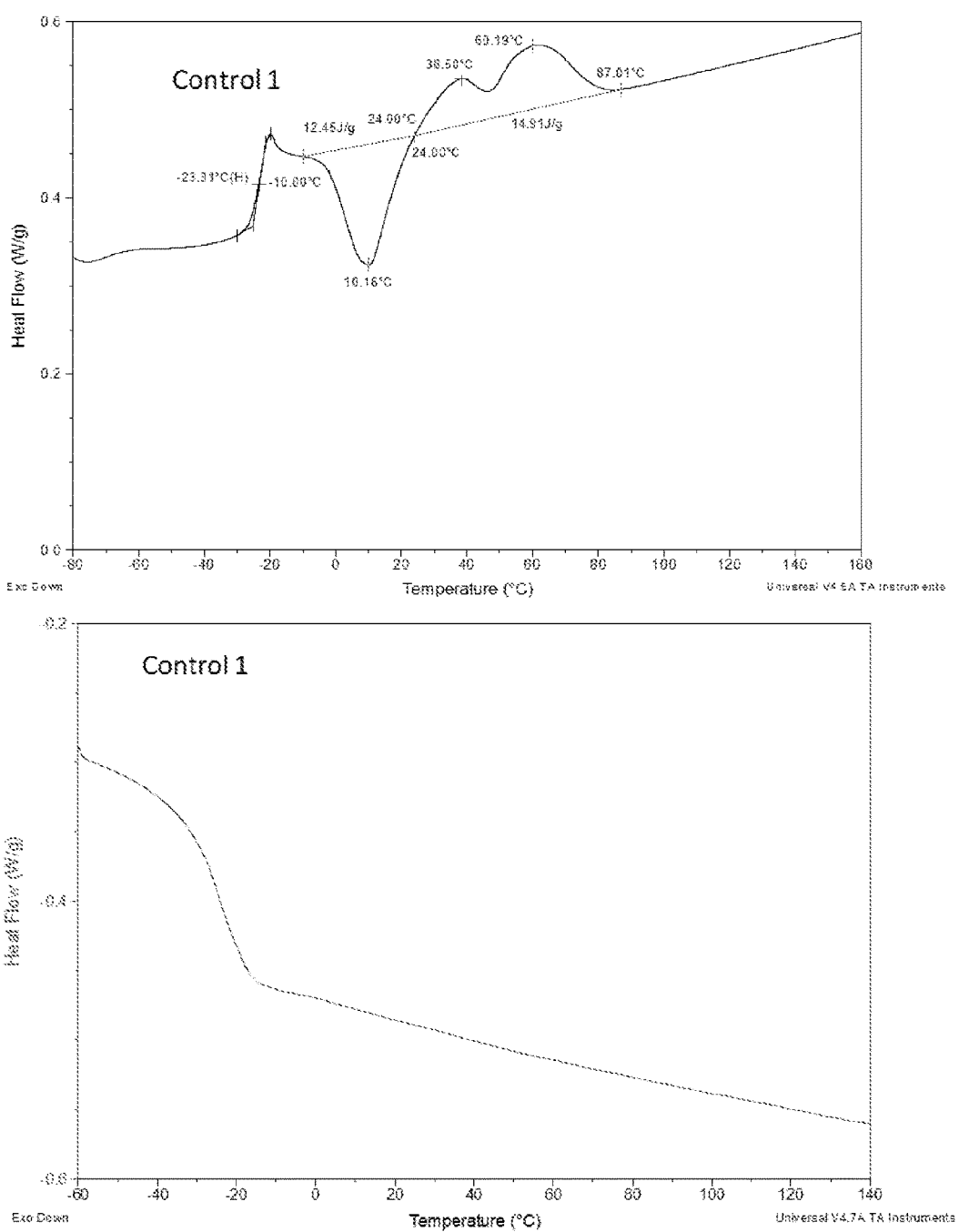
FIG. 1 is a set of two DSC profiles of a propylene/1-octene copolymer (Control 1). The first DSC profile is that of the second heating and the second DSC profile is that of the first cooling.

Embodiments relate a hot melt adhesive composition that includes a crystalline block composite (CBC) and a high comonomer content random or homogeneous propylene-based interpolymer. The hot melt adhesive composition may include a tackifier. The hot melt adhesive composition may include at least one selected from the group of oil and wax (i.e., may include oil and/or wax). For example, embodiments relate to hot-melt adhesive compositions for non-woven assembly adhesives.

Definitions

All references to the Periodic Table of the Elements refer to the Periodic Table of the Elements published and copyrighted by CRC Press, Inc., 1990. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the density and melt index of components of the compositions.

As used with respect to a chemical compound, unless specifically indicated otherwise, the singular includes all isomeric forms and vice versa (for example, "hexane", includes all isomers of hexane individually or collectively). The terms "compound" and "complex" are used interchangeably to refer to organic-, inorganic- and organometal compounds. The term, "atom" refers to the smallest constituent of an element regardless of ionic state, that is, whether or not the same bears a charge or partial charge or is bonded to another atom.

"Composition" and like terms mean a mixture or blend of two or more components. For example, in the context of preparing an HMA, a composition would include a random or homogeneous propylene-based interpolymer and a crystalline block composite (and optionally at least one tackifier and/or at least one wax and/or oil).

"Blend," "polymer blend," and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Polymer" means a compound prepared by polymerizing monomers, whether of the same or a different type. The generic term polymer thus embraces the term homopolymer, usually employed to refer to polymers prepared from only one type of monomer, and the term interpolymer as defined below. It also embraces all forms of interpolymers, e.g., random, block, homogeneous, heterogeneous, etc.

"Interpolymer" and "copolymer" mean a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc.

"Propylene-based polymer," and like terms mean a polymer that comprises a majority weight percent polymerized propylene monomer (based on the total amount of polymerizable monomers), and optionally comprises at least one polymerized comonomer different from propylene so as to form a propylene-based interpolymer. For example, when the propylene-based polymer is a copolymer, the amount of propylene is greater than 50 wt %, based on the total weight of the copolymer. "Units derived from propylene" and like terms mean the units of a polymer that formed from the polymerization of propylene monomers. "Units derived from α-olefin" and like terms mean the units of a polymer that formed from the polymerization of α-olefin monomers, in particular at least one of a $C_2$ and $C_{4-10}$ α-olefin. In contrast, "Ethylene-based polymer" and like terms mean a polymer that comprises a majority weight percent polymerized ethylene monomer (based on the total weight of polymerizable monomers), and optionally may comprise at least one polymerized comonomer different from ethylene so as to form an ethylene-based interpolymer. For example, with the ethylene-based polymer is a copolymer, the amount of ethylene is greater than 50 wt %, based on the total weigh to the copolymer.

"Random propylene-based interpolymer" and like terms mean a propylene/α-olefin interpolymer in which the units derived from the α-olefin monomer are randomly distributed across the polymer chain, as opposed to distributed across the polymer chain in an alternating, periodic, or block pattern.

"Homogeneous propylene-based interpolymer" and like terms mean a propylene/α-olefin interpolymer in which the units derived from the α-olefin monomer are randomly and approximately evenly distributed across the polymer chains of the bulk polymer.

The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. The blocks differ in the amount or type of comonomer incorporated therein, the density, the amount of crystallinity, the type of crystallinity (e.g. polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, and/or any other chemical or physical property. The block copolymers are characterized by unique distributions of both polymer polydispersity (PDI or Mw/Mn) and block length distribution, e.g., based on the effect of the use of a shuttling agent(s) in combination with catalysts (such as those described in the examples).

The term "crystalline block composite" (CBC) refers to composites comprising a crystalline ethylene based polymer (CEP), a crystalline alpha-olefin based polymer (CAOP), and a block copolymer having a crystalline ethylene block (CEB) and a crystalline alpha-olefin block (CAOB), wherein the CEB of the block copolymer is essentially the same composition as the CEP in the crystalline block composite and the CAOB of the block copolymer is essentially the same composition as the CAOP of the crystalline block composite.

The term "block composite" (BC), e.g., as discussed herein with respect to a block composite nucleator, refers to polymers comprising a soft copolymer in which the comonomer content is greater than 10 mol % and less than 90 mol %, a hard polymer in which the monomer is present in an amount greater than 90 mol % and up to 100 mol %, and a block copolymer (e.g., a diblock having a soft segment and a hard segment), wherein the hard segment of the block copolymer is essentially the same composition as the hard polymer in the block composite and the soft segment of the block copolymer is essentially the same composition as the soft copolymer of the block composite. Such block composites are described in, e.g., U.S. Patent Application Publication Nos. 2011/0082257, 2011/0082258, and 2011/0082249, having descriptions with respect to the block composites, processes to make them, and methods of analyzing them.

"Hard" segments/blocks refer to highly crystalline blocks of polymerized units. In the hard segments, the monomer may be present in an amount greater than 90 mol % (e.g., greater than 93 mol %, greater than 95 mol %, and/or greater than 98 mol %). In other words, the comonomer content in the hard segments is less than 2 mol %, less than 5 mol %, less than 7 mol %, and/or less than 10 mol %. In some embodiments, the hard segments comprise all or substantially all propylene units. "Soft" segments refer to amorphous, substantially amorphous, or elastomeric blocks of polymerized units. In the soft segments, the comonomer content (in which the comonomer is different from the monomer) is greater than 10 mol % and less than 90 mol % (e.g., greater than 20 mol % and less than 80 mol % and/or greater than 33 mol % and less than 75 mol %).

The term "crystalline" refers to a polymer or polymer block that possesses a first order transition or crystalline melting point (Tm) as determined by differential scanning calorimetry (DSC) or equivalent technique. The term may be used interchangeably with the term "semicrystalline".

The term "crystallizable" refers to a monomer that can polymerize such that the resulting polymer is crystalline. Crystalline propylene polymers may have, but are not limited to, densities of 0.88 g/cc to 0.91 g/cc and melting points of 100° C. to 170° C.

The term "amorphous" refers to a polymer lacking a crystalline melting point as determined by differential scanning calorimetry (DSC) or equivalent technique.

The term "isotactic" is defined as polymer repeat units having at least 70 percent isotactic pentads as determined by $^{13}$C-NMR analysis. "Highly isotactic" is defined as polymers having at least 90 percent isotactic pentads.

Propylene-Based Interpolymer

The amount of propylene-based interpolymer in the HMA composition is from 10 wt % to 95 wt %, from 20 wt % to 90 wt %, from 30 wt % to 85 wt %, and/or from 50 wt % to 85 wt %, based on the total weight of the HMA composition. The propylene-based interpolymer may be a random interpolymer or a homogeneous interpolymer.

The random or homogeneous propylene-based interpolymers used include propylene interpolymers and reactor copolymers of polypropylene (RCPP), and comprise 7 or more wt % (or 10 or more mol %) of an alpha-olefin comonomer having at least one of 2 and 4 to 10 carbon atoms (i.e., units derived from at least one $C_2$ and $C_{4-10}$ α-olefin). For example, the content of units derived from the alpha-olefin comonomer may be from 7 wt % to 49 wt % (e.g., from 10 wt % to 40 wt %, from 15 wt % to 35 wt %, from 20 wt % to 30 wt %, etc.), based on the total weight of the random or homogeneous propylene-based interpolymer. The random or homogeneous propylene-based interpolymers are distinguishable from block copolymers such as multi-block copolymers and diblock copolymers (e.g., different from crystalline block copolymers). For example, the random or homogeneous propylene-based interpolymers may be made in a typically homogenous solution type polymerization process without the use of a chain shuttling agent, as discussed below with respect to the crystalline block composite.

For example, the random or homogeneous propylene/alpha-olefin interpolymers may be further characterized as comprising (A) between 60 wt % and less than 93 wt % (e.g., between 80 wt % and 99 wt % and/or between 85 wt % and 99 wt %) units derived from propylene, and (B) between 7 wt % and 40 wt % (e.g., between 15 wt % and 30 wt % and/or between 20 wt % and 28 wt %) units derived from at least one of ethylene and/or a $C_{4-10}$ α-olefin (e.g., octene). The propylene/alpha-olefin interpolymers may contain an average of at least 0.001 long chain branches/1000 total carbons.

Exemplary comonomers for polymerizing with propylene include ethylene, 1-butene, 1-pentene, 1-hexene, 1-heptene, 1-octene, 1-nonene, and 1-decene as well as 4-methyl-1-pentene, 4-methyl-1-hexene, 5-methyl-1-hexene, vinylcyclohexane, and styrene. The preferred comonomers include ethylene, 1-butene, 1-hexene, and 1-octene. For example, the random or homogeneous propylene-based copolymers include propylene with ethylene, 1-butene, 1-pentene, 1-hexene, 1-heptene, 1-octene, 1-nonene, 1-decene, or any combination thereof. Additional unsaturated comonomers include 1,3-pentadiene, norbornadiene, and dicyclopentadiene. For example, the alpha-olefin may be octene, with units derived therefrom present in an amount from 10 wt % to 40 wt %, from 15 wt % to 35 wt %, and/or 20 wt % to 30 wt %, with the remainder being propylene.

Exemplary propylene-based interpolymers include, e.g., propylene/ethylene, propylene/1-butene, propylene/1-hexene, propylene/4-methyl-1-pentene, propylene/1-octene, propylene/ethylene/1-butene, propylene/ethylene/ENB, propylene/ethylene/1-hexene, and propylene/ethylene/1-octene. Preferred propylene interpolymers are propylene/ethylene/1-butene, propylene/ethylene/1-hexene, and propylene/ethylene/1-octene.

Exemplary propylene-based polymers are formed by means within the skill in the art, e.g., using single site catalysts (metallocene or constrained geometry) or Ziegler Natta catalysts. Exemplary, polypropylene polymers include VERSIFY™ polymers, available from The Dow Chemical Company, KS 4005 polypropylene copolymer (previously available from Solvay), and KS 300 polypropylene terpolymer (previously available from Solvay). The propylene and comonomers, such as ethylene or alpha-olefin monomers may be polymerized under conditions within the skill in the art, for instance, as disclosed by Galli, et al., Angew. Macromol. Chem., Vol. 120, 73 (1984), or by E. P. Moore, et al. in Polypropylene Handbook, Hanser Publishers, New York, 1996, particularly pages 11-98.

The random or homogeneous propylene-based interpolymer have a narrow molecular weight distribution (MWD), e.g., less than or equal to 4, or less than or equal to 3.5, less than or equal to 3, and/or less than or equal to 2.5. The MWD may be greater than 0, greater than 0.5, and/or greater than 1.0. Propylene-based polymers of narrow MWD are formed by means within the skill in the art. Propylene-based polymers having a narrow MWD can be advantageously provided by visbreaking or by manufacturing reactor grades (non visbroken) using single-site catalysis, or by both methods.

The propylene-based interpolymer can be reactor-grade, visbroken, branched or coupled to provide increased nucleation and crystallization rates. The term "coupled" is used herein to refer to propylene-based polymers which are rheology-modified, such that they exhibit a change in the resistance of the molten polymer to flow during extrusion (for example, in the extruder immediately prior to the annular die). Whereas "visbroken" is in the direction of chain-scission, "coupled" is in the direction of crosslinking or networking. As an example of coupling, a couple agent (for example, an azide compound) is added to a relatively high melt flow rate polypropylene polymer, such that after extrusion, the resultant polypropylene polymer composition attains a substantially lower melt flow rate than the initial melt flow rate. Preferably, for coupled or branched polypropylene, the ratio of subsequent MFR to initial MFR is less than, or equal, to 0.7:1, more preferably less than or equal to 0.2:1.

The random or homogeneous propylene-based interpolymer has a density of 0.90 grams per cubic centimeter (g/cc) or less. For example, the density of the propylene-based copolymer is from 0.83 g/cc to 0.89 g/cc, from 0.84 g/cc to 0.89 g/cc, from 0.85 g/cc to 0.89 g/cc, from 0.85 g/cc to 0.88 g/cc, from 0.85 g/cc to 0.87 g/cc, and/or from 0.86 g/cc to 0.87 g/cc.

The random or homogeneous propylene-based interpolymer has a Brookfield viscosity of less than 50,000 centipoise (cP) (e.g., less than 40,000 cP, less than 30,000 cP, less than 20,000 cP, and/or less than 10,000 cP) at 350° F./177° C. as measured using a Brookfield viscometer. For example, the propylene-based interpolymer is a copolymer that has a Brookfield viscosity from 1000 cP to 40,000 cP, 1000 cP to 30,000 cP, 1000 cP to 20,000 cP, 1000 cP to 10,000 cP, and/or 5,000 cP to 10,000 cP. The propylene-based interpolymer may have a melt flow rate (MFR) from 1 to 5000 g/10 min, in range of 1 to 3000 g/10 min, in the range of 5 to 200 g/10 min, in the range of 30 to 1000 g/10 min, and/or in the range of 30 to 500 g/10 min, as measured in accordance with ASTM D 1238 at 230° C./2.16 kg. In exemplary embodiments, the MFR is 30 or more g/10 min.

The random or homogeneous propylene-based interpolymer may have an average molar mass of less than 100,000 g/mole, less than 90,000 g/mole, less than 85,000 g/mole, and/or less than 80,000 g/mole. For example, the average molar mass may be from 20,000 g/mole to 90,000 g/mole (e.g., 30,000 g/mole to 90,000 g/mole, 40,000 g/mole to 90,000 g/mole, 50,000 g/mole to 90,000 g/mole, 60,000 g/mole to 90,000 g/mole, 60,000 g/mole to 80,000 g/mole, and/or 70,000 g/mole to 80,000 g/mole).

The random or homogeneous propylene-based interpolymer may have a melting temperature (Tm) typically of less than 120° C. and a heat of fusion (Hf) typically of less than 70 Joules per gram (J/g) as measured by differential scanning calorimetry (DSC) as described in U.S. Pat. No. 7,199,203.

The propylene-based interpolymers may include propylene/alpha-olefin interpolymer (e.g., propylene/alpha-olefin copolymer), which is characterized as having substantially isotactic propylene sequences. "Substantially isotactic propylene sequences" means that the sequences have an isotactic triad (mm) measured by $^{13}$C NMR of greater than 0.85; in the alternative, greater than 0.90; in another alternative, greater than 0.92; and in another alternative, greater than 0.93. Isotactic triads are well-known in the art and are described in, for example, U.S. Pat. No. 5,504,172 and International Publication No. WO 2000/001745, which refers to the isotactic sequence in terms of a triad unit in the copolymer molecular chain determined by $^{13}$C NMR spectra.

Exemplary propylene/alpha-olefin interpolymers are further described in the U.S. Pat. Nos. 8,609,228 and 6,525,157. Exemplary propylene/alpha-olefin interpolymers are commercially available from The Dow Chemical Company, under the trade name VERSIFY™, or from ExxonMobil Chemical Company, under the trade name VISTAMAXX™.

Crystalline Block Composite (CBC)

The amount of crystalline block composite in the HMA composition is from 1 wt % to 60 wt %, from 5 wt % to 40 wt %, from 15 wt % to 30 wt %, and/or from 20 wt % to 30 wt %, based on the total weight of the HMA composition. The ratio of the propylene-based interpolymer to crystalline block composite in the HMA composition may be from 95:5 to 40:60. For example, from 95:5 to 50:50, from 95:5 to 70:30, from 90:10 to 74:26, from 85:15 to 74:26, and/or 80:20 to 74:26.

The crystalline block composite (CBC) includes the crystalline ethylene based polymer (CEP), the crystalline alpha-olefin based polymer (CAOP), and the block copolymer having a crystalline ethylene block (CEB) and the crystalline alpha-olefin block (CAOB), wherein the CEB is essentially the same composition as the CEP and the CAOB is essentially the same composition as the CAOP. In the crystalline block composite, the alpha olefin is at least one selected from the group of $C_{3-10}$ α-olefins (e.g., may be propylene and/or butylene) and units derived from the alpha olefin comprise greater than 90 mol % of the CAOB. In exemplary embodiments, the CAOP includes propylene, e.g., greater than 90 mol % or more units derived from propylene and any remainder may be derived from ethylene and/or at least one of selected from the group of $C_{4-10}$ α-olefins. Further, when the CAOB includes propylene, as does the CAOP. The compositional split between the amount of CEP and CAOP will be essentially the same as that between the corresponding blocks in the block copolymer. The CEB and the CAOB may be referred to as hard segments/blocks.

In exemplary embodiments, the CAOB refers to highly crystalline blocks of polymerized alpha olefin units in which units derived from the monomer that is one of $C_{3-10}$ α-olefins are present in an amount greater than 93 mol %, greater than 95 mol %, and/or greater than 96 mol %. In other words, the comonomer content in the CAOB is less than less than 7 mol %, less than 5 mol %, and/or less than 4 mol %. A CAOB with propylene crystallinity may have corresponding melting points that are 80° C. and above, 100° C. and above, 115° C. and above, and/or 120° C. and above. In some embodiments, the CAOB comprises all or substantially all propylene units. CEB refers to blocks of polymerized ethylene units in which the comonomer content (such as propylene) is 10 mol % or less, between 0 mol % and 10 mol %, between 0 mol % and 7 mol %, and/or between 0 mol % and 5 mol %. Said in another way, the CEB is derived from at least 90 mol % ethylene, greater than 90 mol % ethylene, greater than 93 mol % ethylene, and/or greater than 95 mol % ethylene. Such CEBs have corresponding melting points that may be 75° C. and above, 90° C. and above, and/or 100° C. and above.

In an exemplary embodiment, the CAOB may refer to highly crystalline blocks of polymerized alpha olefin units in which the monomer that is one of $C_{3-10}$ α-olefins is present in an amount of at least 88 wt % and/or at least 90 wt %. In other words, the comonomer content in the CAOBs is less than 10 wt %. CEB may refer to blocks of polymerized ethylene units in which the comonomer content (such as propylene) is 10 wt % or less.

Crystalline block composites may be differentiated from conventional, random copolymers, physical blends of polymers, and block copolymers prepared via sequential monomer addition. The crystalline block composites may be differentiated from random copolymers and from a physical blend by characteristics such as crystalline block composite index, better tensile strength, improved fracture strength, finer morphology, improved optics, and/or greater impact strength at lower temperature. The crystalline block composites may be differentiated from block copolymers prepared by sequential monomer addition by molecular weight distribution, rheology, shear thinning, rheology ratio, and block polydispersity. A unique feature of crystalline block composites is that they cannot be fractionated by conventional means by solvent or temperature such as xylene fractionation, solvent/non-solvent, or temperature rising elution fractionation or crystallization elution fractionation since the individual blocks of the block copolymer are crystalline.

When produced in a continuous process, the crystalline block composites desirably possess PDI from 1.7 to 15 (e.g., from 1.8 to 10 and/or from 1.8 to 5). Exemplary crystalline block composites are described in, e.g., US Patent Application Publication Nos. 2011-0313106, 2011-0313108, and 2011-0313108, with reference to descriptions of the crystalline block composites, processes to make them, and methods of analyzing them. In exemplary embodiments, the crystalline block composite may have a molecular weight distribution (MWD), defined as weight average molecular weight divided by number average molecular weight ($M_w/M_n$) of 10.0 or less, 7.0 or less, from 2.0 to 6.0, from 3.0 to 5.0, and/or from 4.0 to 5.0.

The alpha-olefin of the crystalline block composite polymers may be propylene, 1-butene, or 4-methyl-1-pentene and one or more comonomers. For example, the block composites comprise in polymerized form propylene and ethylene and/or one or more $C_{4-20}$ α-olefin comonomers, and/or one or more additional copolymerizable comonomers or they comprise 4-methyl-1-pentene and ethylene and/or one or more $C_{4-10}$ α-olefin comonomers, or they comprise 1-butene and ethylene, propylene and/or one or more $C_5$-$C_{10}$ α-olefin comonomers and/or one or more additional copolymerizable comonomers. Additional exemplary comonomers are selected from diolefins, cyclic olefins, and cyclic diolefins, halogenated vinyl compounds, and vinylidene aromatic compounds. In an exemplary embodiment, the monomer is propylene and the comonomer is ethylene.

Comonomer content in the crystalline block composite polymers may be measured using a Crystalline Block Composite Index (CBCI) determination discussed in the Examples. The CBCI for the crystalline block composite is greater than 0 and less than 1.0. For example, the CBCI is from 0.2 to 0.99, from 0.3 to 0.99, from 0.4 to 0.99, from 0.5 to 0.99, from 0.6 to 0.99, from 0.7 to 0.99, and/or from 0.7 to 0.85. For example, the crystalline block composite comprises from 0.5 to 95 wt % CEP, from 0.5 to 95 wt % CAOP, and from 5 to 99 wt % of the block copolymer. For example, the crystalline block composite comprise from 0.5 to 79 wt % CEP, from 0.5 to 79 wt % CAOP and from 20 to 99 wt % of the block copolymer and/or from 0.5 to 49 wt % CEP, from 0.5 to 49 wt % CAOP, and from 50 to 99 wt % of the block copolymer. Weight percents are based on total weight of crystalline block composite. The sum of the weight percents of CEP, CAOP, and block copolymer equals 100%.

The crystalline block composite may have, a Tm (crystalline melting point) greater than 90° C. (e.g., for both a first peak and a second peak), a Tm greater than 100° C. (e.g., for both a first peak and a second peak), greater than 120° C. (e.g., for at least one of a first peak and a second peak), and/or greater than 125° C. (e.g., for at least one of a first peak and a second peak). For example, the Tm is in the range of from 100° C. to 250° C., from 120° C. to 220° C., and/or from 125° C. to 220° C. According to an exemplary embodiment, the crystalline block composite exhibits a second peak Tm in a range from 100° C. to 130° C. (e.g., 100° C. to 120° C., 100° C. to 110° C., etc.) and a first peak Tm in a range from 110° C. to 150° C. (e.g., 120° C. to 145° C., 130° C. to 140° C., etc.), in which the second peak Tm is less than the first peak Tm.

The MFR (melt flow rate) of the block composites and crystalline block composites is from 0.1 to 1000 dg/min (230° C./2.16 kg), from 1 to 500 dg/min (230° C./2.16 kg), from 3 to 30 dg/min (230° C./2.16 kg), and/or from 5 to 10 dg/min (230° C./2.16 kg).

The crystalline block composite have a weight average molecular weight (Mw) from 10,000 g/mol to 2,500,000 g/mol, from 35000 g/mol to 1,000,000 g/mol, from 50,000 g/mol to 300,000 g/mol, from 50,000 g/mol to 200,000 g/mol, and/or from 50,000 g/mol to 150,000 g/mol. For example, the Mw may be from 20 kg/mol to 1000 kg/mol, from 50 kg/mol to 500 kg/mol, and/or from 80 kg/mol to 125 kg/mol.

The crystalline block composite polymers may be prepared by a process comprising contacting an addition polymerizable monomer or mixture of monomers under addition polymerization conditions with a composition comprising at least one addition polymerization catalyst, at least one cocatalyst, and a chain shuttling agent, said process being characterized by formation of at least some of the growing polymer chains under differentiated process conditions in two or more reactors operating under steady state polymerization conditions or in two or more zones of a reactor operating under plug flow polymerization conditions. The term, "shuttling agent" refers to a compound or mixture of compounds that is capable of causing polymeryl exchange between at least two active catalyst sites under the conditions of the polymerization. That is, transfer of a polymer fragment occurs both to and from one or more of the active catalyst sites. In contrast to a shuttling agent, a "chain transfer agent" causes termination of polymer chain growth and amounts to a one-time transfer of growing polymer from the catalyst to the transfer agent. In a preferred embodiment, the block composites and crystalline block composites comprise a fraction of block polymer which possesses a most probable distribution of block lengths.

Suitable processes useful in producing the block composites and crystalline block composites may be found, for example, in U.S. Patent Application Publication No. 2008/0269412, published on Oct. 30, 2008. In particular, the polymerization is desirably carried out as a continuous polymerization, preferably a continuous, solution polymerization, in which catalyst components, monomers, and optionally solvent, adjuvants, scavengers, and polymerization aids are continuously supplied to one or more reactors or zones and polymer product continuously removed therefrom. Within the scope of the terms "continuous" and "continuously" as used in this context are those processes in which there are intermittent additions of reactants and removal of products at small regular or irregular intervals, so that, over time, the overall process is substantially continuous. The chain shuttling agent(s) may be added at any point during the polymerization including in the first reactor or zone, at the exit or slightly before the exit of the first reactor, or between the first reactor or zone and the second or any subsequent reactor or zone. Due to the difference in monomers, temperatures, pressures or other difference in polymerization conditions between at least two of the reactors or zones connected in series, polymer segments of differing composition such as comonomer content, crystallinity, density, tacticity, regio-regularity, or other chemical or physical difference, within the same molecule are formed in the different reactors or zones. The size of each segment or block is determined by continuous polymer reaction conditions, and preferably is a most probable distribution of polymer sizes.

When producing a block polymer having a crystalline ethylene block (CEB) and a crystalline alpha-olefin block (CAOB) in two reactors or zones it is possible to produce the CEB in the first reactor or zone and the CAOB in the second reactor or zone or to produce the CAOB in the first reactor or zone and the CEB in the second reactor or zone. It may be more advantageous to produce CEB in the first reactor or zone with fresh chain shuttling agent added. The presence of increased levels of ethylene in the reactor or zone producing CEB may lead to much higher molecular weight in that reactor or zone than in the zone or reactor producing CAOB. The fresh chain shuttling agent will reduce the MW of polymer in the reactor or zone producing CEB thus leading to better overall balance between the length of the CEB and CAOB segments.

When operating reactors or zones in series it is necessary to maintain diverse reaction conditions such that one reactor produces CEB and the other reactor produces CAOB. Carryover of ethylene from the first reactor to the second reactor (in series) or from the second reactor back to the first reactor through a solvent and monomer recycle system is preferably minimized. There are many possible unit operations to remove this ethylene, but because ethylene is more volatile than higher alpha olefins one simple way is to remove much of the unreacted ethylene through a flash step by reducing the pressure of the effluent of the reactor producing CEB and flashing off the ethylene. An exemplary approach is to avoid additional unit operations and to utilize the much greater reactivity of ethylene versus higher alpha olefins such that the conversion of ethylene across the CEB reactor approaches 100%. The overall conversion of monomers across the reactors can be controlled by maintaining the alpha olefin conversion at a high level (90 to 95%).

Exemplary catalysts and catalyst precursors for use to from the crystalline block composite include metal complexes such as disclosed in, e.g., International Publication No WO 2005/090426. Other exemplary catalysts are also disclosed in US Patent Publication No. 2006/0199930, US 2007/0167578, and US 2008/0311812; U.S. Pat. No. 7,355,089; and International Publication No. WO 2009/012215.

Tackifiers

The HMA compositions optionally include a tackifier. The tackifier may have a Ring and Ball softening temperature (measured in accordance with ASTM E 28) from 90° C., or 93° C., or 95° C., or 97° C., or 100° C., or 105° C., or 110° C. to 120° C., or 130° C., or 140° C., or 150° C. The tackifier may modify the properties of the HMA composition such as viscoelastic properties (e.g., tan delta), rheological properties (e.g., viscosity), tackiness (e.g., ability to stick), pressure sensitivity, and wetting property. In some embodiments, the tackifier is used to improve the tackiness of the composition. In other embodiments, the tackifier is used to reduce the viscosity of the composition. In particular embodiments, the tackifier is used to wet out adherent surfaces and/or improve the adhesion to the adherent surfaces.

Tackifiers suitable for the compositions disclosed herein can be solids, semi-solids, or liquids at room temperature. Non-limiting examples of tackifiers include (1) natural and modified rosins (e.g., gum rosin, wood rosin, tall oil rosin, distilled rosin, hydrogenated rosin, dimerized rosin, and polymerized rosin); (2) glycerol and pentaerythritol esters of natural and modified rosins (e.g., the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin); (3) copolymers and terpolymers of natured terpenes (e.g., styrene/terpene and alpha methyl styrene/terpene); (4) polyterpene resins and hydrogenated polyterpene resins; (5) phenolic modified terpene resins and hydrogenated derivatives thereof (e.g., the resin product resulting from the condensation, in an acidic medium, of a bicyclic terpene and a phenol); (6) aliphatic or cycloaliphatic hydrocarbon resins and the hydrogenated derivatives thereof (e.g., resins resulting from the polymerization of monomers consisting primarily of olefins and diolefins); (7) aromatic hydrocarbon resins and the hydrogenated derivatives thereof; (8) aromatic modified aliphatic or cycloaliphatic hydrocarbon resins and the hydrogenated derivatives thereof; and combinations thereof. In those embodiments in which a tackifier is present, the amount of tackifier in the HMA composition may be from greater than zero, or 1 wt %, or 5 wt %, or 10 wt %, or 15 wt %, or 20 wt % or 25 wt %, or 30 wt % to 35 wt %, or 40 wt %, or 45 wt %, or 50 wt %, or 55 wt %, or 60 wt %, or 65 wt % and up to 70 wt % of the total weight of the HMA composition. The amount of the tackifier is from 0 wt % to 70 wt % (e.g., from 5 wt % to 60 wt %, from 10 wt % to 50 wt %, from 15 wt % to 40 wt %, etc.).

In an embodiment, the tackifier includes aliphatic, cycloaliphatic and aromatic hydrocarbons and modified hydrocarbons and hydrogenated versions; terpenes and modified terpenes and hydrogenated versions; and rosins and rosin derivatives and hydrogenated versions; and mixtures of two or more of these tackifiers. These tackifying resins have a ring and ball softening point from 70° C. to 150° C., and will typically have a viscosity at 350° F. (177° C.), as measured using a Brookfield viscometer, of no more than 2000 centipoise. They are also available with differing levels of hydrogenation, or saturation, which is another commonly used term. Useful examples include EASTOTAC™ H-100, H-115 and H-130 available from Eastman Chemical Co, which are believed to be partially hydrogenated cycloaliphatic petroleum hydrocarbon resins with softening points of 100° C., 115° C. and 130° C., respectively. It is believed, these are available in the E grade, the R grade, the L grade and the W grade, indicating differing levels of hydrogenation with E being the least hydrogenated and W being the most hydrogenated. The E grade is believed to have a bromine number of 15, the R grade is believed to have a bromine number of 5, the L grade is believed to have a bromine number of 3, and the W grade is believed to have a bromine number of 1. EASTOTAC™ H-142R from Eastman Chemical Co., is believed to have a softening point of about 140° C.

Other useful tackifying resins include ESCOREZ™ 5300, 5400, and 5637, believed to be partially hydrogenated aliphatic petroleum hydrocarbon resins, and ESCOREZ™ 5600, believed to be a partially hydrogenated aromatic modified petroleum hydrocarbon resin, all available from ExxonMobil; WINGTACK™ Extra, which is believed to be an aliphatic, aromatic petroleum hydrocarbon resin available from Goodyear Chemical Co.; HERCOLITE™ 2100, which is believed to be a partially hydrogenated cycloaliphatic petroleum hydrocarbon resin available from Hercules, Inc.; NORSOLENE™, which is believed to be hydrocarbon resins from Cray Valley; and ARKON™, which is believed to be water white, hydrogenated hydrocarbon resins available from Arakawa Europe GmbH.

In an embodiment, the tackifier includes aliphatic hydrocarbon resins such as resins resulting from the polymerization of monomers consisting of olefins and diolefins (e.g., ESCOREZ™ 1310 LC, ESCOREZ™ 2596 from ExxonMobil Chemical Company, Houston, Tex. or PICCOTAC™ 1095, PICCOTAC™ 9095 from Eastman Chemical Company, Kingsport, Tenn.) and the hydrogenated derivatives thereof; alicyclic petroleum hydrocarbon resins and the hydrogenated derivatives thereof (e.g., ESCOREZ™ 5300 and 5400 series from ExxonMobil; EASTOTAC™ resins from Eastman Chemical Company). In some embodiments, the tackifiers include hydrogenated cyclic hydrocarbon resins (e.g., REGALREZ™ and REGALITE™ resins from Eastman Chemical Company).

In an embodiment the tackifying agent is free of groups with which the silanol group of either the silane-grafted amorphous polyalpha-olefin or the silane-grafted ethylene/α-olefin multi-block copolymer will react.

Wax and/or Oil

The HMA compositions optionally include at least one selected from the group of a wax and/or (i.e., wax and/or oil). The wax and/or may be used to reduce the melt viscosity of the HMA composition. The oil may be a plasticizer. Non-limiting examples of waxes include paraffin waxes, microcrystalline waxes, polyethylene waxes, polypropylene waxes, by-product polyethylene waxes, Fischer-Tropsch waxes, oxidized Fischer-Tropsch waxes and functionalized waxes such as hydroxy stearamide waxes and fatty amide waxes. Non-limiting examples of oils include mineral based oils, petroleum based oils, functionalized oils such as glycerol trihydroxyoleate, vegetable oils, fatty oils, other plasticizing oils known in the art, and mixtures thereof. Exemplary oils are hydrocarbon oils that are low in aromatic content and are paraffinic or naphthenic in character.

The amount of the wax and/or oil is from greater than zero, or 1 wt %, or 5 wt %, or 10 wt %, or 15 wt %, or 20 wt %, or 25 wt %, or 30 wt % and up to 40 wt % of the total weight of the HMA composition. The amount of wax and/or in the present HMA composition can be from 0 wt % to 40 wt %. For example, the amount of wax and/or oil is from 1 wt % to 30 wt %, from 5 wt % to 30 wt %, from 15 wt % to 25 wt %, etc., of the total weight of the HMA composition.

Additives and Fillers

The HMA compositions can optionally include one or more additives and/or fillers (different and separate from the tackifier, wax, and oil). Nonlimiting examples of additives include plasticizers, thermal stabilizers, light stabilizers (e.g., UV light stabilizers and absorbers), optical brighteners, antistats, lubricants, antioxidants, catalysts, rheology modifiers, biocides, corrosion inhibitors, dehydrators, organic solvents, colorants (e.g., pigments and dyes), surfactants antiblocking agents, nucleating agents, flame retardants and combinations thereof. Nonlimiting examples of fillers include fumed silica, precipitated silica, talc, calcium carbonates, carbon black, aluminosilicates, clay, zeolites, ceramics, mica, titanium dioxide, and combinations thereof. The type and amount of additives and/or filler is selected to maximize the manufacture, storage, use, and/or economics of the HMA composition.

For example, the HMA composition may include a nucleating agents, such as nucleating agents that is known in the art. For example, the HMA composition may exclude nucleators such as carboxylic acid salts (including sodium benzoate), talc, phosphates, metallic-silicate hydrates, organic derivatives of dibenzylidene sorbitol, sorbitol acetals, organophosphate salts, and combinations thereof. Other nonlimiting examples of nucleating agents include, 3:2,4-di-p-methyl-dibenzilidene sorbitol.

For example, the HMA compositions may including an antioxidant, in which antioxidant refers to types or classes of chemical compounds that are capable of being used to minimize the oxidation that can occur during the processing of polymers. The term also includes chemical derivatives of the antioxidants, including hydrocarbyls. The term further includes chemical compounds, as described later in the description of the antioxidant, that when properly combined with the coupling agent (modifying agent) interact with to form a complex which exhibits a modified Raman spectra compared to the coupling agent or modifying agent alone. The amount of the antioxidant may be less than 1 wt %, based on the total weight of the HMA composition.

The HMA composition may include a plasticizer (e.g., that is the same as or different from an oil). The plasticizer may be an organic composition that can be added to improve extrudability, flexibility, workability, and/or stretchability. The plasticizer may be either a liquid or a solid at ambient temperature. Exemplary liquid plasticizers include hydrocarbon oils, polybutene, liquid tackifying resins, and liquid elastomers. Plasticizer oils are primarily hydrocarbon oils, which are low in aromatic content and which are paraffinic or napthenic in character. Plasticizer oils may be low in volatility, may be transparent, and may have as little color and odor as possible. Other exemplary plasticizers include olefin oligomers, low molecular weight polymers, vegetable oils and their derivatives, and similar plasticizing liquids.

HMA Compositions

In one embodiment the HMA compositions comprise in weight percent based upon the weight of the composition:

(A) 10-90 wt % (e.g., 20-80 and/or 30-70, wt %) of a random or homogeneous propylene-based interpolymer having (i) a $C_2$ and/or $C_{4-10}$ α-olefin comonomer content of 7 or more wt % (e.g., 10 or more wt % and/or 12 or more wt %, (ii) an MWD of 4 or less (e.g., 3.5 or less and/or 3 or less, (iii) a density of 0.90 g/cc or less (e.g., 0.89 g/cc or less and/or 0.88 g/cc or less), and (iv) an MFR of 30 g/10 min or greater (e.g., 40 g/10 min or greater and 50 g/10 min or greater); and (B) 1-60 wt % (e.g., 10-30 wt % and/or more 15-25 wt %, of a crystalline block composite comprising: (1) 10-90 wt % (e.g., 20-80 wt % and/or 30-70 wt %) of a crystalline ethylene block comprising 90 or more mol % (e.g., 92 or more mol % and/or more preferably 95 or more mol %) of units derived from and the remainder of the units derived from a $C_2$ and/or $C_{4-10}$ α-olefin, such as propylene, and (2) 10-90 wt % (e.g., 20-80 wt % and/or 30-70 wt %) of a crystalline alpha-olefin block comprising 90 mol % or more (e.g., 93 or more mol % and 90 or more mol %), units derived from ethylene and the remainder derived from a $C_{3-10}$ α-olefin, such as propylene;

The HMA composition may include from 0 to 70 wt % of at least one tackifier, based on the total weight of the HMA composition. For example, the amount of the tackifier (when included) may be from 5 wt % to 70 wt %, from 10 wt % to 50 wt %, from 20 wt % to 40 wt %, and/or from 30 wt % to 40 wt %, based on the total weight of the HMA composition. In an exemplary embodiment, the HMA composition includes from 30 wt % to 40 wt % of a tackifying resin. The HMA composition may include from 0 to 40 wt % of a wax and/or oil (such a combined weight of wax and/or oil is from 0 to 40 wt %). For example, the amount of the wax and/or (when included) may be from 5 wt % to 40 wt %, from 10 wt % to 35 wt %, from 15 wt % to 30 wt %, and/or from 20 wt % to 30 wt %, based on the total weight of the HMA composition. In an exemplary embodiment, the HMA composition includes from 20 wt % to 30 wt % of a wax. The HMA composition may include from 0 wt % to 5 wt % of other additives, such as an antioxidant. For example, the HMA composition may include from 0.1 wt % to 2 wt % of an antioxidant.

The HMAs are adhesives that are applied as a melt onto the parts to be adhesively bonded and cure as they cool and solidify. The HMA compositions may exclude a solvent so as to be a non-solved based adhesive. The HMA compositions may be block composite based high melt viscosity and high melt flow index adhesive compositions.

The HMA compositions may be melt blended and used in the same manner as known HMA compositions. Melt blending of the composition can be effected by standard means known to those skilled in the art. Examples of compounding equipment are internal batch mixers, such as a BANBURY™ or BOLLING™ internal mixer. Alternatively, continuous single or twin screw mixers can be used, such as a FARREL™ continuous mixer, a COPERION™ twin screw mixer, or a BUSS™ kneading continuous extruder. The components are mixed at a temperature and for a length of time sufficient to fully homogenize the mixture. The type of mixer utilized, and the operating conditions of the mixer, will affect properties of the composition such as viscosity, volume resistivity, and extruded surface smoothness. Melt blending of the HMA with the CBC prior to any finishing operation, such as pelletization or granulation, is preferred.

In one embodiment, the process includes subjecting the melt blend of propylene-based interpolymer, the crystalline block composite and, optionally, wax and/or oil to homogenization, and reducing the melt viscosity of the melt blend. In a further embodiment, the process includes reducing the melt viscosity of the melt blend from 10% to 40%. The homogenization step may include subjecting the melt blend to high pressure homogenization. High pressure homogenization utilizes a high pressure homogenizer.

A "high pressure homogenizer," (or HPH) as used herein, is a device that applies at least 100 bar hydrostatic pressure to a fluid substance and subsequently imposes a restricted flow to the fluid. HPH includes placing the propylene-based interpolymer and the crystalline block composite, and, optionally, a wax and/or oil, in a melt state (polymer melt) or in an otherwise flowable state. A pressure pump delivers the resultant polymer melt to a valve area of the HPH under high pressure, typically from 100 bar to 2000 bar. In the valve area, a homogenization gap is present between a valve seat and a valve. The homogenization gap is a minute space between the valve seat and the valve. As the polymer melt flows through and exits the homogenization gap, a rapid increase in velocity occurs simultaneously with a rapid decrease in pressure. The intense energy release at the homogenization gap causes turbulence and localized pressure breaking the individual chains of the olefin-based polymer. An impact ring may or may not be directly downstream the homogenization gap. Impingement of the polymer melt with the impact ring imparts further turbulence to the polymer melt exiting the homogenization gap. Bounded by no particular theory, it is believed one, some, or all of the following phenomena occur in the HPH and contribute to the viscosity reduction of the polymer melt: high hydrostatic pressure, shear stress, cavitation, turbulence, impingement, and temperature increase.

The HPH may be a two-stage high pressure homogenizer. The first-stage includes the pressure pump and valve area as described above. The second stage includes a second pressure pump and a second valve area that utilizes from 10% to 20% less pressure than the first stage in order to reduce cavitation and increase turbulent flow.

The HPH may reduce the melt viscosity of the polymer melt from 10%, or 15%, or 20%, or 25% to 30% or 35% or 40%. The reduction in melt viscosity is based on the initial melt viscosity of the polymer melt prior to homogenization. The reduced-viscosity polymer melt continues through a channel of the HPH for movement to the next processing stage. In an embodiment, the process includes introducing a polymer melt having a melt viscosity from 2500 cP to 20,000 cP into a high pressure homogenizer. The process includes subjecting the polymer melt to high pressure homogenization and forming a polymer melt with a melt viscosity from 1500 cP to 12,000 cP. In an embodiment, the process includes introducing a formulated hot polymer melt composition having a melt viscosity from 800 cP to 3500 cP into a high pressure homogenizer. The process includes subjecting the formulated hot polymer melt composition to high pressure homogenization and forming a hot polymer melt composition having a melt viscosity from 480 cP to 2100 cP.

The present HMA composition is useful for bonding various substrates. In one embodiment, an article that includes a first substrate, a second substrate, and an adhesive layer between and in contact with the first substrate and the second substrate. The adhesive layer includes the present HMA composition. The HMA composition may be any HMA composition as described above. In one embodiment the adhesive layer bonds the first substrate to the second substrate with a lap shear strength greater than 0.5 MPa. In a further embodiment, the adhesive layer bonds the first substrate to the second substrate with a lap shear strength from greater than 0.5 MPa to 1.5 MPa. Lap shear strength is measured in accordance with ISO 4587. The result is reported in megaPascal, or MPa.

The first substrate may be the same material as the second substrate. Alternatively, the second substrate is a different material than the first substrate. Nonlimiting examples of suitable materials for the first substrate and the second substrate include metal (steel, aluminum) metal foil, wood, glass, polymeric material (such as polyolefin, acrylonitrile butadiene styrene (ABS), thermoplastic, elastomer, polycarbonate, polyurethane), polyvinyl chloride, foam/foam laminate, fabric (woven, non-woven, natural, synthetic), textile, paper, and any combination thereof. For non-wovens assembly adhesives, e.g., for the manufacture of sanitary articles such as infant and adult diapers, sanitary napkins, incontinent pads, bed pads, feminine pads, and panty shields.

In an embodiment, the first substrate includes a rigid material and the second substrate includes a flexible material. A "rigid material" is a material that resists deformation in response to an applied force. As used herein, a "flexible material" is a material that has less resistance to deformation than the aforementioned rigid material. In other words, the flexible material exhibits greater pliability or flexibility compared to the rigid material.

In an embodiment, the first substrate includes a rigid material and the second substrate includes a rigid material. The adhesive layer bonds or otherwise adheres the first rigid material to the second rigid material with a lap shear strength greater than 0.5 MPa, or from greater than 0.5 MPa to 1.5 MPa.

In an embodiment, the first substrate includes a rigid material and the second substrate includes a flexible material. The adhesive layer bonds or otherwise adheres the rigid material to the flexible material with a lap shear strength greater than 0.5 MPa, or from greater than 0.5 MPa to 1.5 MPa.

In an embodiment, the first substrate includes a flexible material and the second substrate includes a flexible material. The adhesive layer bonds or otherwise adheres the first flexible material to the flexible second material with a lap shear strength greater than 0.5 MPa, or from greater than 0.5 MPa to 1.5 MPa.

Examples

Test Methods

Density is measured in accordance with ASTM D-792. The result is reported in gamma (g) per cubic centimeter, or g/cc.

Melt index ($I_2$) is measured in accordance with ASTM D-1238 (190° C.; 2.16 kg). The result is reported in grams/10 minutes.

Melt flow rate (MFR) is measured in accordance with ASTM D-1238 (230° C.; 2.16 kg). The result is reported in grams/10 minutes.

Molecular weight distribution (MWD) is measured using Gel Permeation Chromatography (GPC). In particular, conventional GPC measurements are used to determine the weight-average (Mw) and number-average (Mn) molecular weight of the polymer, and to determine the MWD (which is calculated as Mw/Mn). Samples are analyzed with a high-temperature GPC instrument (Polymer Laboratories, Inc. model PL220). The method employs the well-known universal calibration method, based on the concept of hydrodynamic volume, and the calibration is performed using narrow polystyrene (PS) standards, along with four Mixed A 20 μm columns (PLgel Mixed A from Agilent (formerly Polymer Laboratory Inc.)) operating at a system temperature of 140° C. Samples are prepared at a "2 mg/mL" concentration in 1,2,4-trichlorobenzene solvent. The flow rate is 1.0 mL/min, and the injection size is 100 microliters.

As discussed, the molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, (621) 1968) to derive the following equation:

$$M_{polyethylene} = a*(M_{polystyrene})^b.$$

In this equation, a=0.4316 and b=1.0 (as described in Williams and Ward, J. Polym. Sc., Polym. Let., 6, 621 (1968)). Polyethylene equivalent molecular weight calculations were performed using VISCOTEK TriSEC software Version 3.0.

The equivalent polypropylene molecular weights of each PS standard were calculated by using following equation, with reported Mark-Houwink coefficients for polypropylene (Th. G. Scholte, N. L. J. Meijerink, H. M. Schoffeleers, and A. M. G. Brands, J. Appl. Polym. Sci., 29, 3763-3782 (1984)) and polystyrene (E. P. Otocka, R. J. Roe, N.Y. Hellman, P. M. Muglia, Macromolecules, 4, 507 (1971)):

$$M_{PP} = \left(\frac{K_{PS} M_{PS}^{a_{PS}+1}}{K_{PP}}\right)^{\frac{1}{a_{PP}+1}},$$

where $M_{PP}$ is PP equivalent MW, $M_{PS}$ is PS equivalent MW, log K and a values of Mark-Houwink coefficients for PP and PS are listed below.

| Polymer | a | log K |
|---|---|---|
| Polypropylene | 0.725 | −3.721 |
| Polystyrene | 0.702 | −3.900 |

A logarithmic molecular weight calibration was generated using a fourth order polynomial fit as a function of elution volume. Number average and weight average molecular weights were calculated according to the following equations:

$$M_n = \frac{\Sigma^i Wf_i}{\Sigma^i (Wf_i / M_i)}, \quad (2)$$

$$M_w = \frac{\Sigma^i (Wf_i * M_i)}{\Sigma^i (Wf_i)}, \quad (3)$$

where $Wf_i$ and $M_i$ are the weight fraction and molecular weight of elution component i, respectively.

Differential Scanning calorimetry (DSC) is used to measure crystallinity in the polymers (e.g., ethylene-based (PE) polymers), e.g., referring to FIGS. 1 to 7. About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for polypropylene or "PP"). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)× 100 (for PE)).

Unless otherwise stated, melting point(s) ($T_m$) of each polymer is determined from the second heat curve (peak Tm), and the crystallization temperature ($T_c$) is determined from the first cooling curve (peak $T_c$).

Melting Temperature of Homopolymer Polypropylene measurement uses DSC to determine the melting point. The temperature at the maximum heat flow rate with respect to a linear baseline is used as the melting point. The linear baseline is constructed from the beginning of the melting (above the glass transition temperature) and to the end of the melting peak. The temperature is raised from room temperature to 200° C. at 10° C./min, maintained at 200° C. for 5 min, decreased to 0° C. at 10° C./min, maintained at 0° C.

for 5 min and then the temperature is raised from 0° C. to 200° C. at 10° C./min, and the data are taken from this second heating cycle.

High Temperature Thermal Gradient Interaction Chromatography measurement uses a commercial Crystallization Elution Fractionation instrument (CEF) (Polymer Char, Spain) is used to perform high temperature thermal gradient interaction chromatography (HT-TGIC, or TGIC) measurement (Cong, et al., Macromolecules, 2011, 44 (8), 3062-3072). A single Hypercarb column (100×4.6 mm, Part#35005-104646, Thermo Scientific) is used for separation. A "¼ inch×3/16 inch ID" stainless steel column with a length of 3 inches packed with 27 micron glass beads (Catalog# GL01918/20-27um, MO-SCI Specialty Products, LLC, Rolla, Mo., USA), is installed in front of the IR detector, in the top oven of the CEF instrument. The experimental parameters are: top oven/transfer line/needle temperature at 150° C., dissolution temperature at 160° C., dissolution stirring setting of 2, sample loading volume of 0.400 mL, pump stabilization time of 15 seconds, a pump flow rate of cleaning column at 0.500 mL/m, pump flow rate of column loading at 0.300 ml/min, stabilization temperature at 150° C., stabilization time (pre, prior to load to column) at 3.0 min, stabilization time (post, after loaded to column) at 1.0 min, SF (Soluble Fraction) time at 5.0 min, cooling rate of 3.00° C./min from 150° C. to 30° C., flow rate during cooling process of 0.00 ml/min, heating rate of 2.00° C./min from 30° C. to 150° C., isothermal time at 150° C. for 15 min, elution flow rate of 0.500 mL/min, and an injection loop size of 140 microliters.

The flow rate during cooling process can be adjusted according to the length of graphite column where all the polymer fractions must remain on the column at the end of cooling cycle.

Samples are prepared by the PolymerChar autosampler at 160° C., for 120 minutes, at a concentration of 4.0 mg/ml in ODCB (defined below). Silica gel 40 (particle size 0.2~0.5 mm, catalogue number 10181-3, EMD) is dried in a vacuum oven at 160° C., for about two hours, prior to use. 2,6-di-tert-butyl-4-methylphenol (1.6 grams, BHT, catalog number B1378-500G, Sigma-Aldrich) and the silica gel 40 (5.0 grams) are added to two liters of ortho-dichlorobenze (ODCB, 99% anhydrous grade, Sigma-Aldrich). This "ODCB containing BHT and silica gel" is now referred to as "ODCB." This ODCB is sparged with dried nitrogen ($N_2$) for one hour prior to use.

The TGIC data is processed on a PolymerChar (Spain) "GPC One" software platform. The temperature calibration is performed with a mixture of about 4 to 6 mg Eicosane, 14.0 mg of isotactic homopolymer polypropylene iPP (polydispersity of 3.6 to 4.0, and molecular weight Mw reported as polyethylene equivalent of 150,000 to 190,000 Daltons, and polydispersity (Mw/Mn) of 3.6 to 4.0, and a DSC melting temperature at 158-159 C with the specified method below), and 14.0 mg of homopolymer polyethylene HDPE (zero comonomer content, Mw reported as polyethylene equivalent as 115,000 to 125,000 Daltons, and polydispersity of 2.5 to 2.8), in a 10 mL vial filled with 7.0 mL of ODCB. The dissolution time is 2 hours at 160° C.

Figure 8:
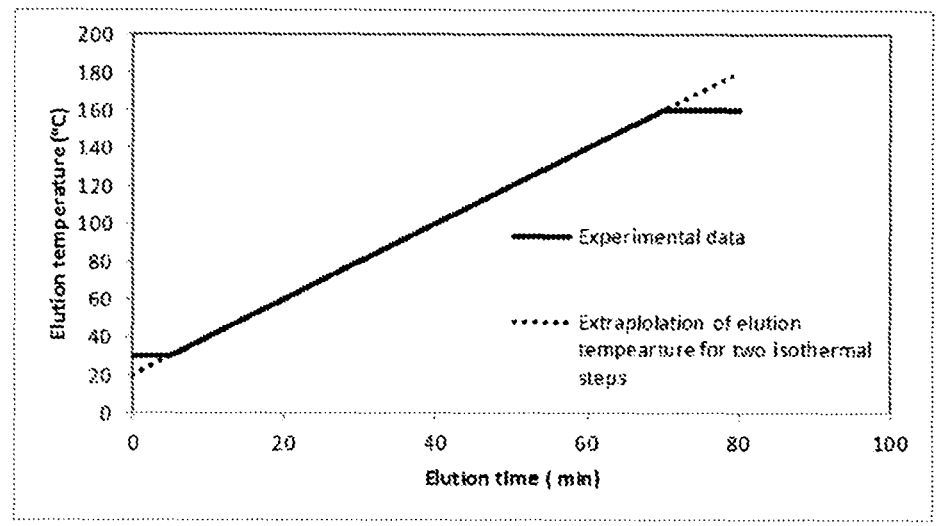
FIG. 8 is an extrapolation of the elution temperature for thermal gradient interaction chromatography temperature calibration.

The calibration process (30° C. to 150° C. for Eicosane elution and HDPE elution) consists of the following steps:

(1) Extrapolate the eluting temperature for each of the isothermal steps during elution according to heating rate (demonstrated in FIG. 8).

(2) Calculate the delay volume: Shift the temperature (x-axis) corresponding to the IR measurement channel chromatogram (y-axis), so that the Eicosane peak maximum (y-axis) is coincident with elution temperature at 30.0° C. The delay volume is calculated from the temperature difference (30° C.—the actual elution temperature of Eicosane peak maximum) divided by the heating rate of the method, and then multiplied by the elution flow rate.

(3) Adjust each recorded elution temperature with this same delay volume adjustment.

(4) Linearly scale the heating rate, such that the observed HDPE reference has an elution peak maximum temperature of 150.0° C., while the Eicosane elution peak maximum temperature remains at 30.0° C.

(5) The peak temperature of the polypropylene will be observed within the range of 119.3-120.2° C., which is a validation of the calibration method.

Data processing for polymer samples of TGIC is described below.

A solvent blank (ODCB from solvent reservoir) is run at the same experimental conditions as the polymer samples. Data processing for polymer samples includes: subtraction of the solvent blank for each detector channel, temperature extrapolation as described in the calibration process, compensation of temperature with the delay volume determined from the calibration process, and adjustment in elution temperature axis to the 30° C. and 150° C. range as calculated from the heating rate of the calibration.

The chromatogram (measurement channel of IR-4 detector) is integrated with PolymerChar "GPC One" software. A straight baseline is drawn from the visible difference, when the peak falls to a flat baseline (roughly a zero value in the blank subtracted chromatogram) at high elution temperature and the minimum or flat region of detector signal on the high temperature side of the soluble fraction (SF).

The upper temperature integration limit is established based on the visible difference when the peak falls to the flat baseline region (roughly a zero value in the blank subtracted chromatogram). The lower temperature integration limit is established based on the intersection point of the baseline with the chromatogram including the soluble fraction.

The soluble fraction (SF) is defined as the weight percentage of the material eluting including and below 34.0° C.

Materials eluting as soluble fraction % =

$$100X \frac{\int_{lower\ temperature\ intergation\ limit}^{34.0} IR-4dT}{\int_{lower\ temperature\ intergation\ limit}^{Upper\ temperature\ intergation\ limit} IR-4dT}$$

High Temperature Liquid Chromatography is done according to the published method with minor modifications (Lee, D.; Miller, M. D.; Meunier, D. M.; Lyons, J. W.; Bonner, J. M.; Pell, R. J.; Shan, C. L. P.; Huang, T. *J. Chromatogr. A* 2011, 1218, 7173). Two Shimadzu (Columbia, Md., USA) LC-20AD pumps are used to deliver decane and trichlorobenzene (TCB) respectively. Each pump is connected to a 10:1 fixed flow splitter (Part #: 620-PO20-HS, Analytical Scientific Instruments Inc., CA, USA). The splitter has a pressure drop of 1500 psi at 0.1 mL/min in $H_2O$ according to the manufacturer. The flow rates of both pumps are set at 0.115 mL/min. After the splitting, the minor flow is 0.01 mL/min for both decane and TCB, determined by weighing the collected solvents for more than 30 min. The volume of the collected eluent is determined by the mass and the densities of the solvents at room temperature. The minor flow is delivered to the HTLC column for separation. The main flow is sent back to the solvent reservoir. A 50-µL mixer (Shimadzu) is connected after the splitters to mix the solvents from Shimadzu pumps. The mixed solvents are then delivered to the injector in the oven of Waters (Milford, Mass., USA) GPCV2000. A Hypercarb™ column (2.1×100 mm, 5 µm particle size) is connected between the injector and a 10-port VICI valve (Houston, Tex., USA). The valve is equipped with two 60-µL sample loops. The valve is used to continuously sample eluent from the first dimension (D1) HTLC column to the second dimension (D2) SEC column. The pump of Waters GPCV2000 and a PLgel Rapid™-M column (10×100 mm, 5 µm particle size) are connected to the VICI valve for D2 size exclusion chromatography (SEC). The symmetric configuration is used for the connections as described in the literature (Van der Horst, A.; Schoenmakers, P. J. *J. Chromatogra. A* 2003, 1000, 693). A dual-angle light scattering detector (PD2040, Agilent, Santa Clara, Calif., USA) and an IR5 inferred absorbance detector are connected after the SEC column for measurement of concentration, composition, and molecular weight.

Separation for HTLC

Approximately 30 mg are dissolved in 8-mL decane by gently shaking the vial at 160° C. for 2 hours. The decane contains 400 ppm BHT (2,6-Di-tert-butyl-4-methylphenol) as the radical scavenger. The sample vial is then transferred to the autosampler of GPCV2000 for injection. The temperatures of the autosampler, the injector, both the Hypercarb and the PLgel columns, the 10-port VICI valve, and both the LS and IR5 detectors are maintained at 140° C. throughout the separation.

The initial conditions before injection are as follows. The flow rate for the HTLC column is 0.01 mL/min. The solvent composition in the D1 Hypercarb column is 100% decane. The flow rate for the SEC column is 2.51 mL/min at room temperature. The solvent composition in the D2 PLgel column is 100% TCB. The solvent composition in the D2 SEC column does not change throughout the separation.

A 311-µL aliquot of sample solution is injected into the HTLC column. The injection triggers the gradient described below:

From 0-10 min, 100% decane/0% TCB;
From 10-651 min, TCB is increased linearly from 0% TCB to 80% TCB.

The injection also triggers the collection of the light scattering signal at 15° angle (LS15) and the "measure" and "methyl" signals from IR5 detector ($IR_{measure}$ and $IR_{methyl}$) using EZChrom™ chromatography data system (Agilent). The analog signals from detectors are converted to digital signals through a SS420X analog-to-digital converter. The collection frequency is 10 Hz. The injection also triggers the switch of the 10-port VICI valve. The switch of the valve is controlled by the relay signals from the SS420X converter. The valve is switched every 3 min. The chromatograms are collected from 0 to 651 min. Each chromatogram consist of 651/3=217 SEC chromatograms.

After the gradient separation, 0.2 mL of TCB and 0.3 mL of decane are used to clean and re-equilibrate the HTLC column for next separation. The flow rate of this step is 0.2 mL/min, delivered by a Shimadzu LC-20 AB pump connected to the mixer.

Data Analysis for HTLC

The 651 min raw chromatogram is first unfolded to give 217 SEC chromatograms. Each chromatogram is from 0 to 7.53 mL in the unit of 2D elution volume. The integration limit is then set and the SEC chromatograms undergo spike removal, baseline correction, and smoothing. The process is similar to batch analysis of multiple SEC chromatograms in conventional SEC. The sum of all the SEC chromatograms is inspected to ensure both left side (upper integration limit) and right side (lower integration limit) of the peak were at the baseline as zero. Otherwise, the integration limit i adjusted to repeat the process.

Each SEC chromatogram n from 1 to 217 yields an X-Y pair in the HTLC chromatogram, where n is the fraction number:

$X_n$=elution volume (mL)=D1 flow rate×n×$t_{switch}$ where $t_{switch}$=3 min is the switch time of the 10-port VICI valve.

$$Y_n = \text{signal intensity (Voltage)} = \sum_{peak\ start}^{peak\ end} IR_{measure,n}$$

Figure 9:
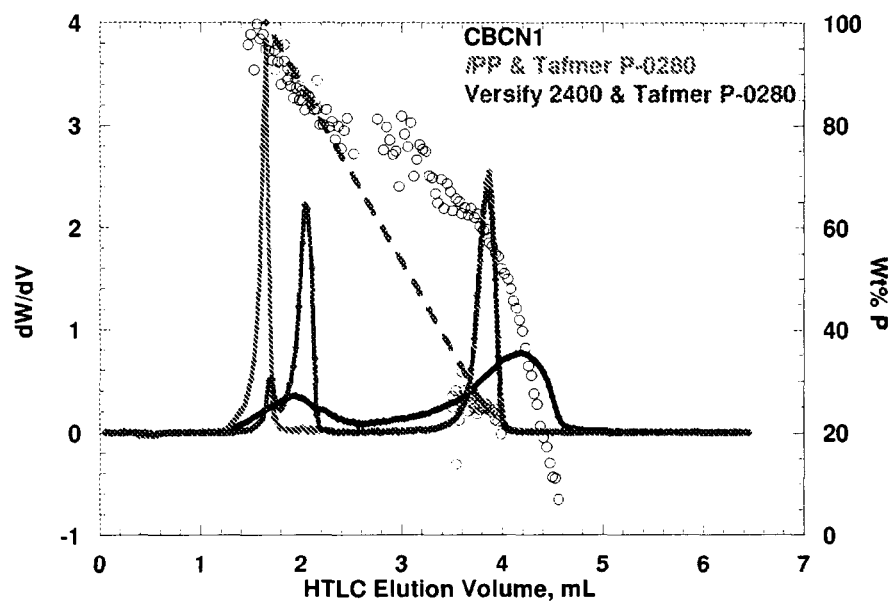
FIG. 9 reports high temperature liquid chromatography (HTLC) chromatograms of Comparative BCN1, a blend of iPP with TAFMER™ P0280, and a blend of VERSIFY™ 2400 with TAFMER™ P0280. The dashed line is a linear regression fit of chemical compositions of iPP, VERSIFY™ 2400 (main peak), and TAFMER™ P0280 versus their elution volumes.

The above equation uses $IR_{measure}$ signal as the example. The obtained HTLC chromatogram shows the concentrations of the separated polymeric components as a function of elution volume. The normalized $IR_{measure}$ HTLC chromatogram is shown in FIG. 9 with Y represented by dW/dV, meaning the normalized weight fractions with respect to the elution volume.

X-Y pairs of data are also obtained from $IR_{methyl}$ and LS15 signals. The ratio of $IR_{methyl}/IR_{measure}$ is used to calculate composition after calibration. The ratio of LS15/$M_{measure}$ is used to calculate weight-average molecular weight ($M_w$) after calibration.

Calibration follows the procedures of Lee et al., ibid. High density polyethylene (HDPE), isotactic polypropylene (iPP), and ethylene-propylene copolymer with propylene contents of 20.0, 28.0, 50.0, 86.6, 92.0, and 95.8 wt % P are used as the standards for $IR_{methyl}/IR_{measure}$ calibration. The composition of the standards are determined by NMR. The standards are run by SEC with IR5 detector. The obtained $IR_{methyl}/IR_{measure}$ ratios of the standards are plotted as a function of their compositions, yielding the calibration curve.

The HDPE reference is used for routine LS15 calibration. The $M_w$ of the reference is predetermined by GPC as 104.2 kg/mol with LS and RI (refractive index) detectors. GPC uses NBS 1475 as the standard in GPC. The standard has a certified value of 52.0 kg/mol by NIST. Between 7 to 10 mg of the standard is dissolved in 8-mL decane at 160° C. The solution is injected to the HTLC column in 100% TCB. The polymer is eluted under constant 100% TCB at 0.01 mL/min. Therefore, the peak of the polymer appears at the HTLC column void volume. A calibration constant, Ω, is determined from the total LS15 signals ($A_{LS15}$) and the total $IR_{measure}$ signals ($A_{IR,measure}$):

$$\Omega = \frac{A_{LS15}}{A_{IR,measure} M_w}$$

The experimental LS15/$IR_{measure}$ ratio is then converted to $M_w$ through Ω.

By way of example, three HTLC chromatograms are shown in FIG. 9. The black chromatogram is for Comparative BCN1 (i.e., CBCN1). The red chromatogram is for the blend of iPP and TAFMER™ P-0280 (an ethylene/alpha-olefin copolymer product available from Mitsui Chemicals). The blue chromatogram is for the blend of VERSIFY™ 2400 (a propylene-ethylene copolymer available from The Dow Chemical Company) and TAFMER™ P-0280. The dashed line is a linear regression fit of the chemical compositions of iPP, VERSIFY™ 2400, and TAFMER™ P-0280 versus their peak elution volumes. Note that VERSIFY™ 2400 has two peaks. The composition and elution volume of the main peak is used for the linear fit. The three polymers all have $M_w$ above 80,000 Daltons.

Microstructure Index Estimation:

In adsorption based solvent gradient interaction chromatography (SGIC) separation of polymer, block copolymer is eluted later than the random copolymer of the same chemical composition (Brun, Y.; Foster, P. *J. Sep. Sci.* 2010, 33, 3501). In particular, the material used for the microstructure index estimation is separated into two fractions, i.e., a random copolymer and a block copolymer of the same chemical composition. The early eluting fraction, i.e., the first fraction, indicates the comparatively higher presence of random copolymers. The late eluting component, i.e., the second fraction, indicates the comparatively higher presence of block copolymers. The microstructure index is defined as:

$$\text{Microstructure Index} = \frac{1}{\sum_{\text{peak start of component 1}}^{\text{peak end of component 2}} w_n \frac{\text{Comp}_{n,random}}{\text{Comp}_{n,sample}}}$$

where $w_n$ is weight fraction of fraction n. $\text{Comp}_{n,random}$ is the chemical composition (wt % P) of fraction n derived from the linear calibration curve (Dashed line in FIG. 9). The curve reaches 0 wt % P at 4.56 mL and 100 wt % P at 1.65 mL. The compositions beyond 4.56 mL are considered to be 0 wt % P. The compositions before 1.65 mL are considered to be 100 wt % P. $\text{Comp}_{n,sample}$ is the chemical composition (wt % P) of fraction n measured from the sample.

Materials for Composite Formation

Catalyst ([[rel-2',2'''-[(1R,2R)-1,2-cylcohexanediylbis(methyleneoxy-O)]bis[3-(9H-carbazol-9-yl)-5-methyl[1,1'-biphenyl]-2-olato-O]](2-)]dimethyl-hafnium) and Cocatalyst-1, a mixture of methyldi($C_{14-18}$ alkyl)ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$], substantially as disclosed in U.S. Pat. No. 59,199,883, Ex. 2., are purchased from Boulder Scientific and used without further purification.

CSA-1 (diethylzinc or DEZ) and Cocatalyst-2 (modified methylalumoxane (MMAO)) are purchased from Akzo Nobel and used without further purification.

The Solvent is a hydrocarbon mixture (ISOPAR®E) obtainable from ExxonMobil Chemical Company and purified through beds of 13-X molecular sieves prior to use.

Crystalline Block Composite 1 (CBC1 in Table 1, below), Comparative Block Composite Nucleator 1 (CBCN1 in Table 2, below), and Comparative Composite Nucleator 1 (CCN1 in Table 3, below) are each prepared using two continuous stirred tank reactors (CSTR) connected in series (in a solution pilot facility). Each reactor is hydraulically full and set to operate at steady state conditions. Monomers, Solvent, Catalyst, Cocatalyst-1, Cocatalyst-2, and CSA-1 are flowed to the first reactor according to the process conditions outlined in Tables 1, 2, and 3 for each of the composites. Then, the first reactor contents as described in Tables 1, 2 and 3 are flowed to a second reactor in series. Additional Catalyst, Cocatalyst-1, and Cocatalyst-2 are added to the second reactor.

Referring to Tables 1, 2, and 3, below, to form CBC1, CBCN1 (comparative), and CCN1 (comparative), various process conditions are changed.

TABLE 1

Process Conditions for Producing CBC1

| Condition | 1st Reactor | 2nd reactor |
|---|---|---|
| Reactor Control Temp. (° C.) | 140.33 | 135.19 |
| Solvent Feed (lb/hr) | 242.01 | 244.58 |
| Propylene Feed (lb/hr) | 47.08 | 49.30 |
| Ethylene Feed (lb/hr) | 5.46 | — |
| Reactor Propylene Conc. (g/L) | 2.00 | 2.02 |
| Hydrogen Feed (SCCM) | 9.62 | 9.88 |
| Catalyst Flow (lb/hr) | 1.96 | 2.14 |
| Catalyst Conc. (ppm) | 29.91 | 900.17 |
| Cocatalyst-1 Flow (lb/hr) | 1.47 | 2.16 |
| Cocatalyst-1 Conc. (ppm) | 399.40 | 7499.77 |
| Cocatalyst-2 Flow (lb/hr) | 1.83 | 0.30 |
| Cocatalyst-2 Conc. (ppm) | 2686.20 | 2686.20 |
| DEZ Flow (lb/hr) | 0.64 | — |
| DEZ Concentration (ppm) | 35985.2 | — |

TABLE 2

Process Conditions for Producing CBCN1

| Condition | 1st Reactor | 2nd reactor |
|---|---|---|
| Reactor Control Temp. (° C.) | 140.00 | 115.54 |
| Solvent Feed (lb/hr) | 144.28 | 359.67 |
| Propylene Feed (lb/hr) | 3.73 | 60.27 |
| Ethylene Feed (lb/hr) | 27.98 | 10.17 |
| Reactor Propylene Conc. (g/L) | 1.95 | 1.97 |
| Hydrogen Feed (SCCM) | 9.61 | 9.61 |
| Catalyst Flow (lb/hr) | 0.8 | 0.5 |
| Catalyst Conc. (ppm) | 150.03 | 500.02 |
| Cocatalyst-1 Flow (lb/hr) | 0.81 | 0.31 |
| Cocatalyst-1 Conc. (ppm) | 199.94 | 7999.51 |
| Cocatalyst-2 Flow (lb/hr) | 1.43 | 0.31 |
| Cocatalyst-2 Conc. (ppm) | 195.31 | 14.97 |
| DEZ Flow (lb/hr) | 1.50 | — |
| DEZ Concentration (ppm) | 4496.93 | — |

TABLE 3

Process Conditions for Producing CCN1

| Condition | 1st Reactor | 2nd reactor |
|---|---|---|
| Reactor Control Temp. (° C.) | 115.06 | 115.09 |
| Solvent Feed (lb/hr) | 389.88 | 114.55 |
| Propylene Feed (lb/hr) | 70.01 | 21.02 |
| Ethylene Feed (lb/hr) | 10.52 | 0 |
| Reactor Propylene Conc. (g/L) | 2.33 | 2.05 |
| Hydrogen Feed (SCCM) | 9.62 | 9.61 |
| Catalyst Flow (lb/hr) | 1.2 | 0.5 |
| Catalyst Conc. (ppm) | 49.93 | 500.02 |
| Cocatalyst-1 Flow (lb/hr) | 1.61 | 0.31 |
| Cocatalyst-1 Conc. (ppm) | 499.98 | 7999.51 |
| Cocatalyst-2 Flow (lb/hr) | 0.8 | 0.31 |
| Cocatalyst-2 Conc. (ppm) | 1992.61 | 1797.31 |
| DEZ Flow (lb/hr) | 1.29 | — |
| DEZ Concentration (ppm) | 29986.88 | — |

Referring to the above, CBC1 includes a crystalline polyethylene and crystalline isotactic polypropylene diblock copolymer having 90 wt % ethylene in the crystalline polyethylene block (in addition to a crystalline ethylene based polymer and a crystalline propylene based polymer). CBCN1 includes a propylene-ethylene block composite nucleator comprising 30 wt % hard block and 70 wt % soft block, with the hard block comprising 91 wt % units derived from ethylene and with the soft block comprising 15 wt % units derived from ethylene (in addition to a propylene based polymer and an ethylene based polymer). CCN1 is a propylene-ethylene composite nucleator comprising 80 wt % soft polymer and 20 wt % hard polymer, with soft polymer comprising 14 wt % ethylene.

Measured properties of the resultant CBC1, CBCN1 (comparative), and CCN1 (comparative), are shown in Table 4, below. With respect to wt % PP from HTLC Separation, crystalline block composite tend to show a polypropylene fraction and a polyethylene fraction when separated by high temperature liquid chromatography.

TABLE 4

Properties for CBC1, CBCN1, and CCN1

| Example | wt % PP from HTLC Separation | MFR (230° C./ 2.16 kg) | Mw g/mol | Mw/Mn | Total wt % $C_2$ | Tm (° C.) Peak 1 (Peak 2) | Tc (° C.) | Melt Enthalpy (J/g) | Tg (° C.) |
|---|---|---|---|---|---|---|---|---|---|
| CBC1 | 15.4 | 7 | 103,570 | 4.48 | 46.9 | 133 (108) | 91.4 | 120.4 | * |
| CBCN1 | N/A | 17 | 105,730 | 2.59 | 37.7 | 102 | 80 | 41.9 | −31 |
| CCN1 | N/A | 21 | 158,040 | 2.56 | 10.8 | 139 | 71 | 27.6 | −29 |

* Not measured
N/A: Composition cannot be separated via HTLC (indication of lack of crystalline polypropylene fraction)

With respect to CBC1, the Crystalline Block Composite Index (CBCI) is measured to be 0.707 based on the method shown in Table 5, below. The crystalline block composite index could not be determined for Comparative BCN1 and Comparative CN1. In particular, CBCI provides an estimate of the quantity of block copolymer within the crystalline block composite under the assumption that the ratio of CEB to CAOB within the diblock is the same as the ratio of crystalline ethylene to crystalline alpha-olefin in the overall crystalline block composite. This assumption is valid for these statistical olefin block copolymers based on the understanding of the individual catalyst kinetics and the polymerization mechanism for the formation of the diblocks via chain shuttling catalysis as described in the specification. This CBCI analysis shows that the amount of isolated PP is less than if the polymer was a simple blend of a propylene homopolymer (in this example the CAOP) and polyethylene (in this example the CEP). Consequently, the polyethylene fraction contains an appreciable amount of propylene that would not otherwise be present if the polymer was simply a blend of polypropylene and polyethylene. To account for this "extra propylene", a mass balance calculation can be performed to estimate the CBCI from the amount of the polypropylene and polyethylene fractions and the weight % propylene present in each of the fractions that are separated by HTLC.

TABLE 5

Crystalline Block Composite Index (CBCI) Determination

| Line # | Variable | Source | CBC1 |
|---|---|---|---|
| 1 | Overall wt % C3 Total | Measured | 53.100 |
| 2 | wt % C3 in PP block/polymer | Measured | 99.000 |
| 3 | wt % C3 in PE block/polymer | Measured | 10.000 |
| 4 | wt fraction PP (in block or polymer) | Eq. 2 below | 0.484 |
| 5 | wt fraction PE (in block or polymer) Analysis of HTLC | 1-Line 4 | 0.516 |

TABLE 5-continued

Crystalline Block Composite Index (CBCI) Determination

| Line # | Variable | Source | CBC1 |
|---|---|---|---|
| | Separation | | |
| 6 | wt fraction isolated PP | Measured | 0.142 |
| 7 | wt fraction PE fraction | Measured | 0.858 |
| 8 | wt % C3 in PE-fraction | Eq. 4 below | 45.503 |

TABLE 5-continued

Crystalline Block Composite Index (CBCI) Determination

| Line # | Variable | Source | CBC1 |
|---|---|---|---|
| 9 | wt fraction PP-diblock in PE fraction | Eq. 6 below | 0.399 |
| 10 | wt fraction PE in PE fraction | 1-Line 10 | 0.601 |
| 11 | wt fraction Diblock in PE fraction | 10/Line 4 | 0.824 |
| 12 | Crystalline Block Composite Index (CBCI) | Eq. 7 below | 0.707 |

Referring to Table 5, above, crystalline block composite index (CBCI) is measured by first determining a summation of the weight % propylene from each component in the polymer according to equation 1, below, which results in the overall weight % propylene/C3 (of the whole polymer). This mass balance equation can be used to quantify the amount of the PP and PE present in the diblock copolymer. This mass balance equation can also be used to quantify the amount of PP and PE in a binary blend or extended to a ternary, or n-component blend. For the CBCs, the overall amount of PP or PE is contained within the blocks present in the diblock and the unbound PP and PE polymers.

$$\text{Wt \% C3}_{Overall} = w_{PP}(\text{wt \% C3}_{PP}) + w_{PE}(\text{wt \% C3}_{PE}) \quad \text{Eq. 1}$$

where
$w_{PP}$=weight fraction of PP in the polymer
$w_{PE}$=weight fraction of PE in the polymer
wt % $C3_{PP}$=weight percent of propylene in PP component or block
wt % $C3_{PP}$=weight percent of propylene in PE component or block Note that the overall weight % of propylene (C3) is measured from C13 NMR or some other composition measurement that represents the total amount of C3 present in the whole polymer. The weight % propylene in the PP block (wt % $C3_{PP}$) is set to 100 or if otherwise known from its DSC melting point, NMR measurement, or other composition estimate, that value can be put into its place. Similarly, the weight % propylene in the PE block (wt % $C3_{PE}$) is set to 100 or if otherwise known from its DSC melting point, NMR measurement, or other composition estimate, that value can be put into its place.

Calculating the Ratio of PP to PE in the Crystalline Block Composite:

Based on Equation 1, the overall weight fraction of PP present in the polymer can be calculated using Equation 2 from the mass balance of the total C3 measured in the polymer. Alternatively, it could also be estimated from a mass balance of the monomer and comonomer consumption during the polymerization. Overall, this represents the amount of PP and PE present in the polymer regardless of whether it is present in the unbound components or in the diblock copolymer. For a conventional blend, the weight fraction of PP and weight fraction of PE corresponds to the individual amount of PP and PE polymer present. For the crystalline block composite, it is assumed that the ratio of the weight fraction of PP to PE also corresponds to the average block ratio between PP and PE present in this statistical block copolymer.

$$w_{PP} = \frac{\text{wt \%} \; C3_{Overall} - \text{wt \%} \; C3_{PE}}{\text{wt \%} \; C3_{PP} - \text{wt \%} \; C3_{PE}} \qquad \text{Eq. 2}$$

where
- $w_{PP}$=weight fraction of PP present in the whole polymer
- wt % $C3_{PP}$=weight percent of propylene in PP component or block
- wt % $C3_{PP}$=weight percent of propylene in PE component or block To estimate the amount of the Diblock in the Crystalline Block Composite, apply equations 3 through 5, and the amount of the isolated PP that is measured by HTLC analysis is used to determine the amount of polypropylene present in the diblock copolymer. The amount isolated or separated first in the HTLC analysis represents the 'unbound PP' and its composition is representative of the PP hard block present in the diblock copolymer. By substituting the overall weight % C3 of the whole polymer in the left hand side of equation 3, and the weight fraction of PP (isolated from HTLC) and the weight fraction of PE (separated by HTLC) into the right hand side of equation 3, the weight % of C3 in the PE fraction can be calculated using equations 4 and 5. The PE fraction is described as the fraction separated from the unbound PP and contains the diblock and unbound PE. The composition of the isolated PP is assumed to be the same as the weight % propylene in the iPP block as described previously.

$$\text{wt \%} \; C3_{Overall} = \qquad \text{Eq. 3}$$
$$w_{PPisolated}(\text{wt \%} \; C3_{PP}) + w_{PE-fraction}(\text{wt \%} \; C3_{PE-fraction})$$

$$\text{wt \%} \; C3_{PE-fraction} = \frac{\text{wt \%} \; C3_{Overall} - w_{PPisolated}(\text{wt \%} \; C3_{PP})}{w_{PE-fraction}} \qquad \text{Eq. 4}$$

$$w_{PE-fraction} = 1 - w_{PPisolated} \qquad \text{Eq. 5}$$

where
- $w_{PPisolated}$=weight fraction of isolated PP from HTLC
- $w_{PE-fraction}$=weight fraction of PE separated from HTLC, containing the diblock and unbound PE
- wt % $C3_{PP}$=weight % of propylene in the PP; which is also the same amount of propylene present in the PP block and in the unbound PP
- wt % $C3_{PE-fraction}$=weight % of propylene in the PE-fraction that was separated by HTLC
- wt % $C3_{Overall}$=overall weight % propylene in the whole polymer The amount of wt % C3 in the polyethylene fraction from HTLC represents the amount of propylene present in the block copolymer fraction that is above the amount present in the 'unbound polyethylene'. To account for the 'additional' propylene present in the polyethylene fraction, the only way to have PP present in this fraction is for the PP polymer chain to be connected to a PE polymer chain (or else it would have been isolated with the PP fraction separated by HTLC). Thus, the PP block remains adsorbed with the PE block until the PE fraction is separated.

The amount of PP present in the diblock is calculated using Equation 6.

$$w_{PP-diblock} = \frac{\text{wt \%} \; C3_{PE-fraction} - \text{wt \%} \; C3_{PE}}{\text{wt \%} \; C3_{PP} - \text{wt \%} \; C3_{PE}} \qquad \text{Eq. 6}$$

Where
- wt % $C3_{PE-fraction}$=weight % of propylene in the PE-fraction that was separated by HTLC (Equation 4)
- wt % $C3_{PP}$=weight % of propylene in the PP component or block (defined previously)
- wt % $C3_{PE}$=weight % of propylene in the PE component or block (defined previously)
- $w_{PP-diblock}$=weight fraction of PP in the diblock separated with PE-fraction by HTLC The amount of the diblock present in this PE fraction can be estimated by assuming that the ratio of the PP block to PE block is the same as the overall ratio of PP to PE present in the whole polymer. For example, if the overall ratio of PP to PE is 1:1 in the whole polymer, then it assumed that the ratio of PP to PE in the diblock is also 1:1. Thus the weight fraction of diblock present in the PE fraction would be weight fraction of PP in the diblock ($w_{PP-diblock}$) multiplied by two. Another way to calculate this is by dividing the weight fraction of PP in the diblock ($w_{PP-diblock}$) by the weight fraction of PP in the whole polymer (equation 2).

To further estimate the amount of diblock present in the whole polymer, the estimated amount of diblock in the PE fraction is multiplied by the weight fraction of the PE fraction measured from HTLC. To estimate the crystalline block composite index, the amount of diblock copolymer is determined by equation 7. To estimate the CBCI, the weight fraction of diblock in the PE fraction calculated using equation 6 is divided by the overall weight fraction of PP (as calculated in equation 2) and then multiplied by the weight fraction of the PE fraction. The value of the CBCI can range from 0 to 1, wherein 1 would be equal to 100% diblock and zero would be for a material such as a traditional blend or random copolymer.

$$CBCI = \frac{w_{PP-diblock}}{w_{PP}} \cdot w_{PE-fraction} \qquad \text{Eq. 7}$$

Where
- $w_{PP-diblock}$=weight fraction of PP in the diblock separated with the PE-fraction by HTLC (Equation 6)
- $w_{PP}$=weight fraction of PP in the polymer
- $w_{PE-fraction}$=weight fraction of PE separated from HTLC, containing the diblock and unbound PE (Equation 5)

As discussed above the crystalline block composite index (CBCI) could not be measured for CBCN1 (comparative), as such the Microstructure Index of CBCN1 is determined according to the method discussed above and is shown in Table 6, below.

TABLE 6

Microstructure Index Estimation of CBCN1*

| Example | Composition Peak 1: wt % P > 70 | | | Composition Peak 2: wt. % P < 70 | | | Microstructure index |
|---|---|---|---|---|---|---|---|
| | Concentration wt % | Composition wt % P | Mw Kg/mol | Concentration Wt % | Composition Wt % P | Mw kg/mol | |
| CBCN1 | 25.4 | 87.8 | 72.4 | 74.6 | 49.0 | 131 | 1.8 |

*Microstructure Index of CCN1 could not be determined

Materials for Propylene-Based Interpolymer Formation

For the examples, a propylene/1-octene copolymer (␣P01) (also referred to as Control 1) is prepared using a single stirred tank reactor. The reactor is hydraulically full and set to operate at steady state conditions. Monomers, Solvent (an hydrocarbon solvent available as Isopar™ E Fluid from ExxonMobil), Catalyst, Cocatalyst-1, Cocatalyst-2, and hydrogen are flowed to the reactor according to the process conditions outlined in Table 7, below. The same Catalyst, Cocatalyst-1, and Cocatalyst-2 as discussed above with respect to the composite were used to form the Control 1.

TABLE 7

Process Conditions For Control 1

| Condition | 1st reactor |
|---|---|
| Reactor Control Temp. (° C.) | 110 |
| Solvent Feed (lb/hr) | 34 |
| Propylene Feed (lb/hr) | 5.23 |
| Octene Feed (lb/hr) | 2.20 |
| Reactor Propylene Conc. (g/L) | 28.32 |
| Hydrogen Feed (SCCM) | 32.95 |
| Catalyst Flow (lb/hr) | 0.14 |
| Catalyst Conc. (ppm) | 16.10 |
| Cocatalyst-1 Flow (lb/hr) | 0.15 |
| Cocatalyst-1 Conc. (ppm) | 122.57 |
| Cocatalyst 2 Flow (lb/hr) | 0.19 |
| Cocatalyst 2 Conc. (ppm) | 17.58 |

Measured properties of PO1 (Control 1) are the following:
(1) Mole Fraction Comonomer (i.e., Octene): 0.110
(2) wt % Comonomer (i.e., Octene): 24.9 wt %
(3) Density: 0.862 g/cc
(4) Melting Temperature (Tm): 60.9° C.
(5) Glass Transition Temperature (Tg): −21.7° C.
(6) Brookfield viscosity at 170° C.: 8520 cP
(7) Number average molecular weight (Mn): 20,532 g/mole
(8) Weight average molecular weight (Mw): 50,075 g/mole
(9) Average molar mass (Mz): 79,272 g/mole
(9) Molecular Weight Distribution (MWD): 2.4

Materials for Example Blends

Licocene® 6102 (PP1), which is believed to be a metallocene polypropylene wax with a drop point range from 142° C. to 148° C. measured in accordance with ASTM E 28, a Brookfield viscosity at 170° C. of approximately 60 mPa*s, and a density of approximately 0.90 g/cc (available from Clariant).

Hyperform® HPN-68L (NUC1), which is believed to be a disodium cis-endo-bicyclo (2.2.1) heptane-2-3-dicarboxylate based nucleator for polypropylene (available from Milliken).

Millad® NX® 8000 (NUC2), which is believed to be a bis(4-propylbenzylidene) propyl sorbitol based a clarifying nucleating agent for polypropylene (available from Milliken).

Irganox® 1010 (AO1, which is believed to be a pentaerythritol tetrakis(3-(3,5-di-tert-butyl-4-hydroxyphenyl) propionate) based antioxidant (available from BASF).

Table 8 reports various blends used in the Example Blends.

TABLE 8

Example Blends

| | Component | | | | | | | |
|---|---|---|---|---|---|---|---|---|
| | PO1 (wt %) | PP1 (wt %) | CBC1 (wt %) | CCN1 (wt %) | CBCN1 (wt %) | NUC1 (wt %) | NUC2 (wt %) | AO1 (wt %) |
| Control 1 | 99.5 | — | — | — | — | — | — | 0.5 |
| Inventive 1 | 74.6 | — | 24.9 | — | — | — | — | 0.5 |
| Comparative A | 74.6 | 24.9 | — | — | — | — | — | 0.5 |
| Comparative B | 74.6 | — | — | 24.9 | — | — | — | 0.5 |
| Comparative C | 74.6 | — | — | — | 24.9 | — | — | 0.5 |
| Comparative D | 99.2 | — | — | — | — | 0.3 | — | 0.5 |
| Comparative E | 99.0 | — | — | — | — | — | 0.5 | 0.5 |

The materials required for the above blends are weighed on a Mettler-Toledo AT201 model lab balance. In order to achieve a uniform dispersion and distribution of the formulations, a HAAKE™ drive model rs5000 rheometer equipped with a small bowl (~50 g capacity) is used. The bowl is heated to 177° C. and mixed at 70 RPM for 5 minutes. Irganox® 1010 is added after all of the solid materials have achieved a melted state.

The blends of Table 8 are subjected to DSC analysis, and the approximate results are reported in Table 9 and depicted in FIGS. 1 to 7.

TABLE 9

DSC Analysis of Table 8 Blends

| | STUDY # | | | | | | |
|---|---|---|---|---|---|---|---|
| | First Cooling | | Second Heating | | | | Secondary Crystallization |
| | Tc1 °C. | Tc2 °C. | Tc1 °C. | Tm1 °C. | Tm2 °C. | Tm3 °C. | Tm4 °C. | Enthalpy (J/g) |
| Control 1 | — | — | 10 | 39 | 60 | — | — | 12.5 |
| Inventive 1 | 70 | 90 | 9 | 39 | 63 | 106 | 134 | 1.0 |
| Comparative A | — | 85 | 10 | — | 65 | — | 135 | 3.8 |
| Comparative B | 48 | — | — | — | 58 | — | 137 | 0 |
| Comparative C | 65 | 81 | 9 | 38 | 64 | 102 | — | 6.1 |
| Comparative D | — | — | 10 | 38 | 60 | — | — | 11.6 |
| Comparative E | — | — | 10 | 38 | 60 | — | — | 11.8 |

Figure 3:
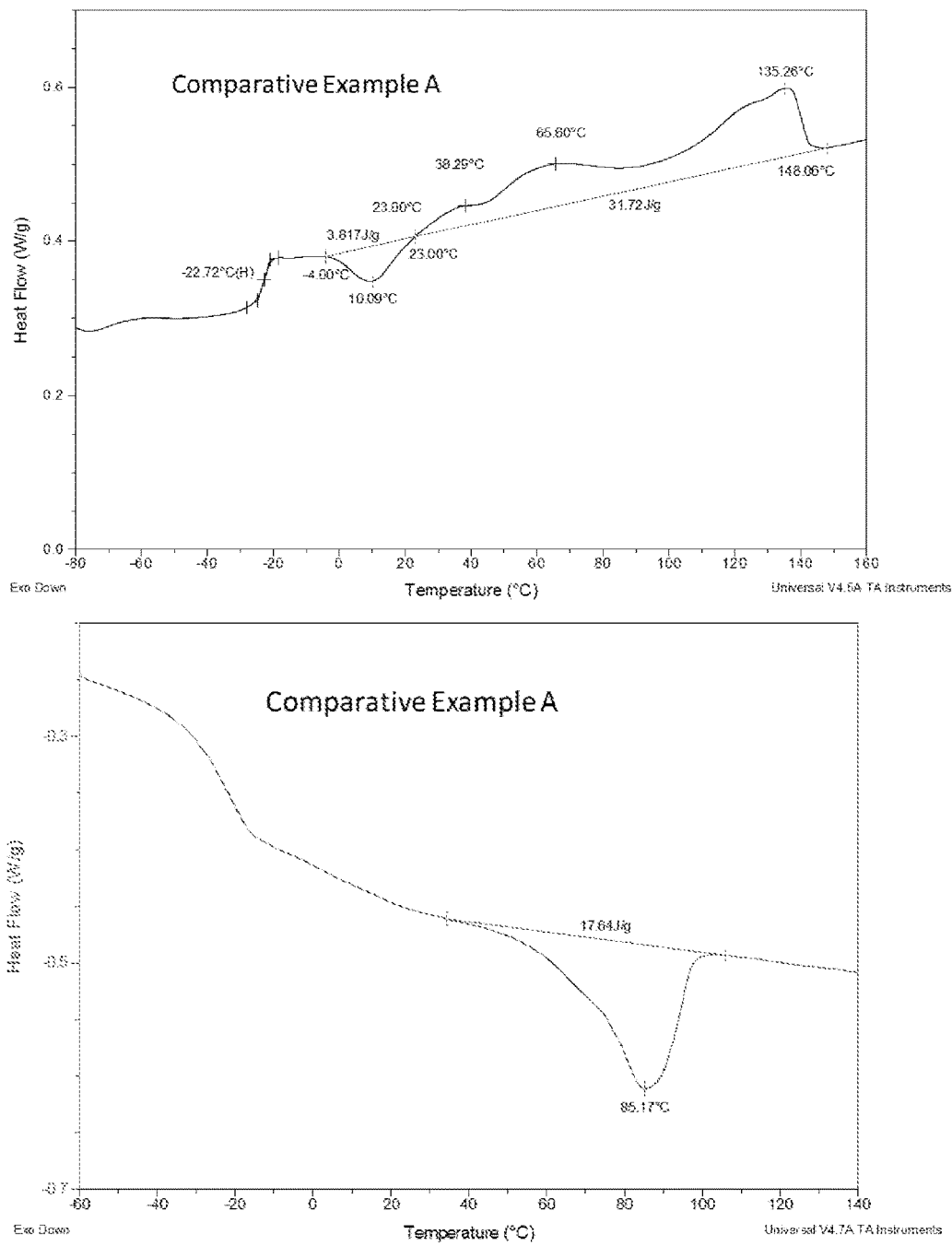
FIG. 3 is a set of two DSC profiles of Comparative Example A, i.e., a blend of Control 1 of FIG. 1 and Licocene® 6102, which is a metallocene polypropylene wax. The first DSC profile is that of the second heating and the second DSC profile is that of the first cooling.

As seen in Table 9 and FIG. 1, when cooled from the melt at 10° C./min, Control 1 exhibits no cooling crystallization. Upon reheating, a secondary cooling curve (i.e., crystallization) with a peak at about 10° C., and about 12.5 J/g enthalpy is evident. Such a product would exhibit very long cycle times in typical adhesive processing equipment such as spray application on personal hygiene articles requiring quick bonding. As seen in Table 9 and FIG. 3, Comparative Example A, using the Licocene® 6102, as a nucleator does show some nucleating capability, a first cooling curve with a peak Tc of about 85° C. However, upon reheating, there is a secondary cooling curve with a 10° C. peak. The enthalpy is about 3.8 J/g, indicating a substantial portion of the composition has not been nucleated.

Figure 4:
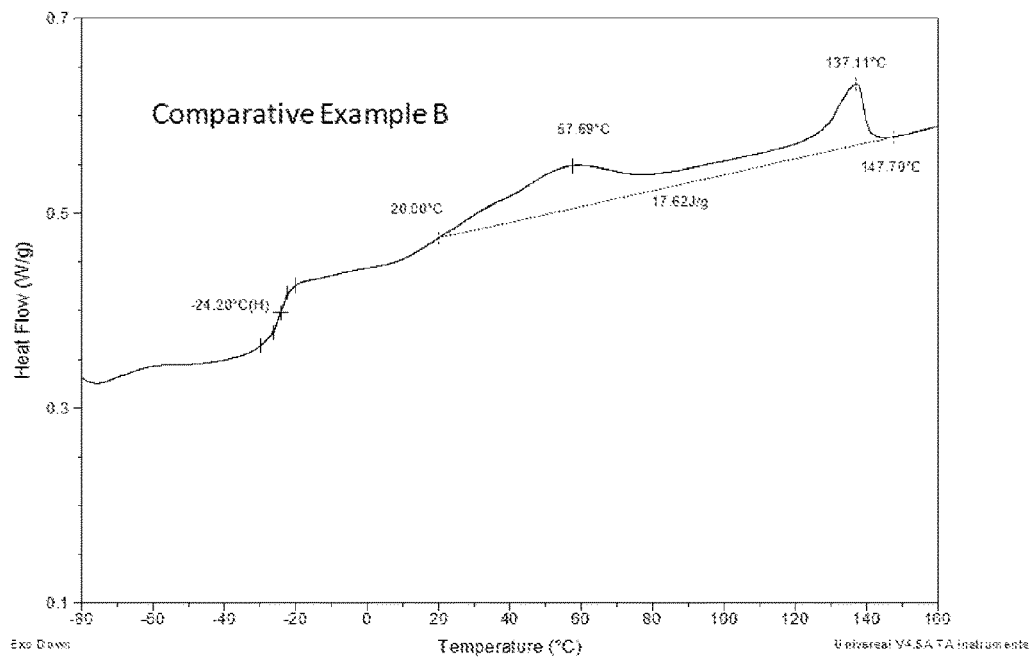
FIG. 4 is a set of two DSC profiles of Comparative Example B, i.e., a blend of Control 1 of FIG. 1 and Comparative CN1 in the Examples. The first DSC profile is that of the second heating and the second DSC profile is that of the first cooling.
Figure 4:
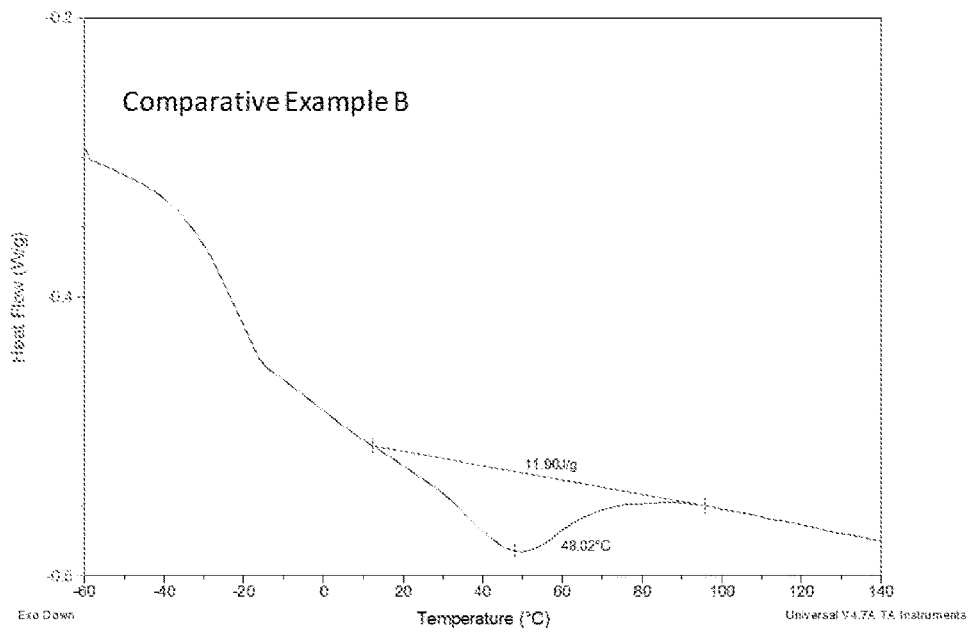

Table 9 and FIG. 4 shows that Comparative Example B exhibits a cooling curve with a peak Tc at about 48° C. No secondary cooling curve is evident upon reheating. However, it should be noted that Tc is relatively low and the cooling curve is relatively broad over a range of about 80° C. Thus, Comparative Example B is nucleated, but a composition crystallization temperature of 48° C. indicates that the practical set up time in polymer processing equipment would be longer than desired.

Figure 5:
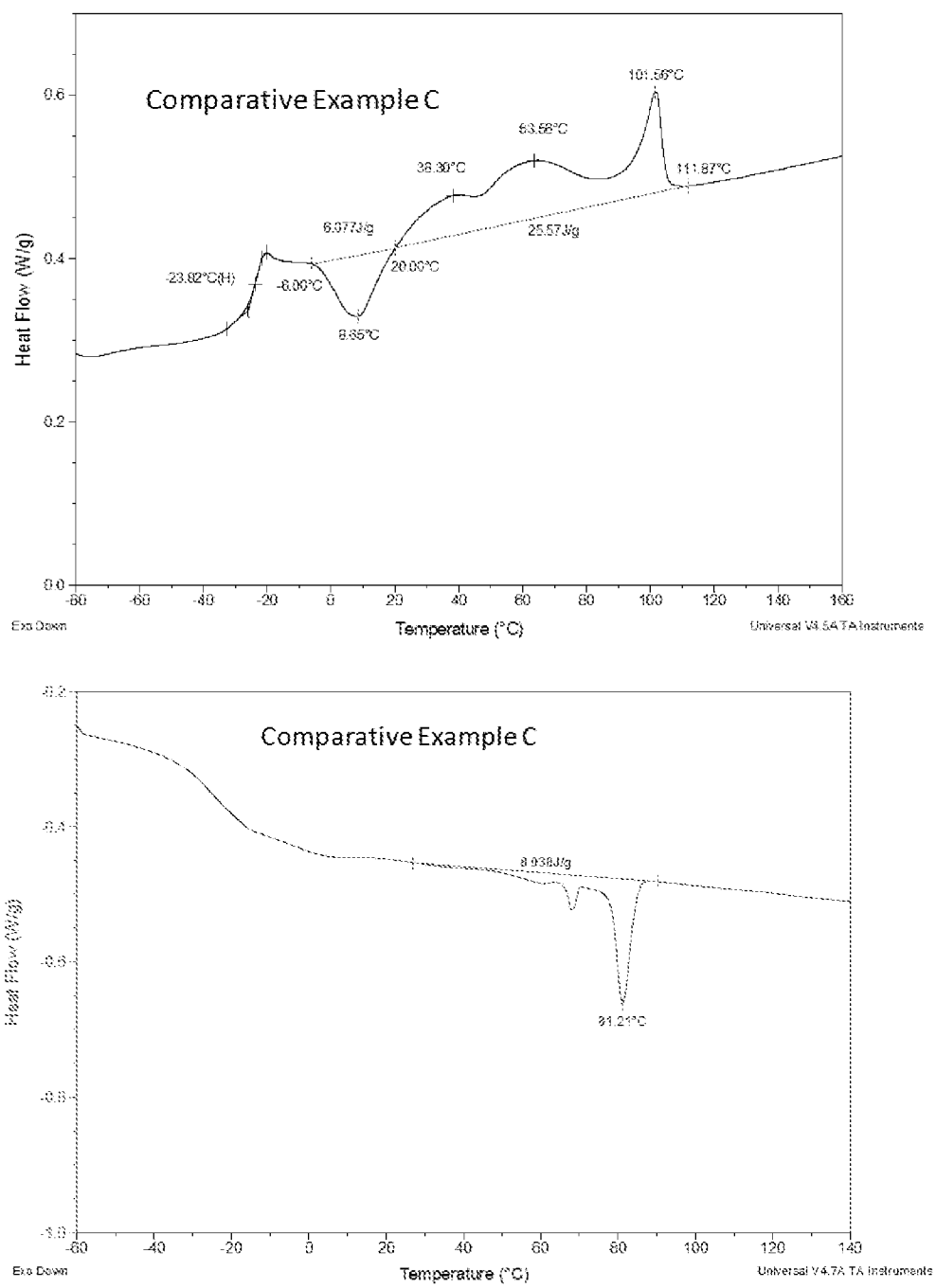
FIG. 5 is a set of two DSC profiles of Comparative Example C, i.e., a blend of Control 1 of FIG. 1 and Comparative BCN1 in the Examples. The first DSC profile is that of the second heating and the second DSC profile is that of the first cooling.

Table 9 and FIG. 5 show that Comparative Example C exhibits a cooling curve with two prominent, sharp crystallization peak temperatures at about 81° C. and 65° C., indicating nucleation and relatively fast crystallization rates. However, Comparative Example C exhibits a prominent secondary cooling curve upon reheating, with a peak Tc of about 10° C., and about 6.0 J/g enthalpy is evident.

Figure 6:
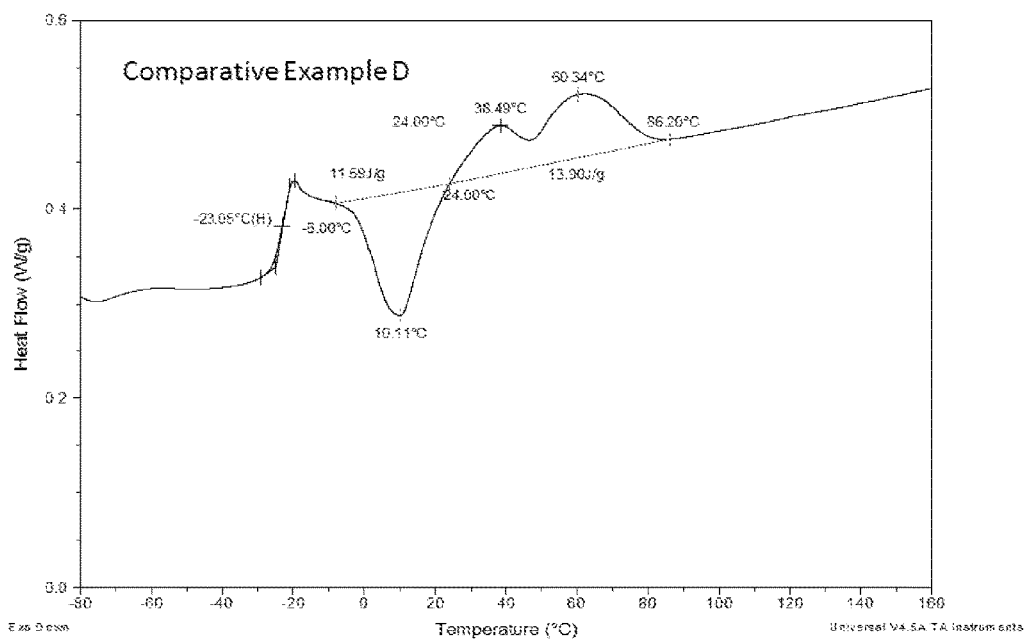
FIG. 6 is a set of two DSC profiles of Comparative Example D, i.e., a blend of Control 1 of FIG. 1 and Hyperform® HPN-68L (a nucleator). The first DSC profile is that of the second heating and the second DSC profile is that of the first cooling.
Figure 6:
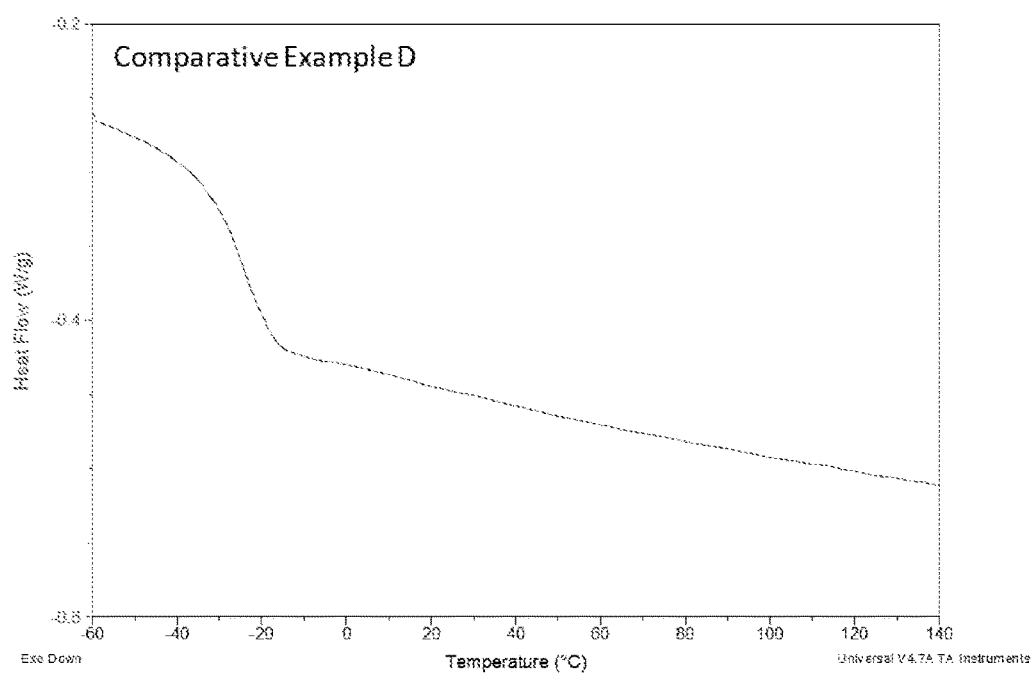
Figure 7:
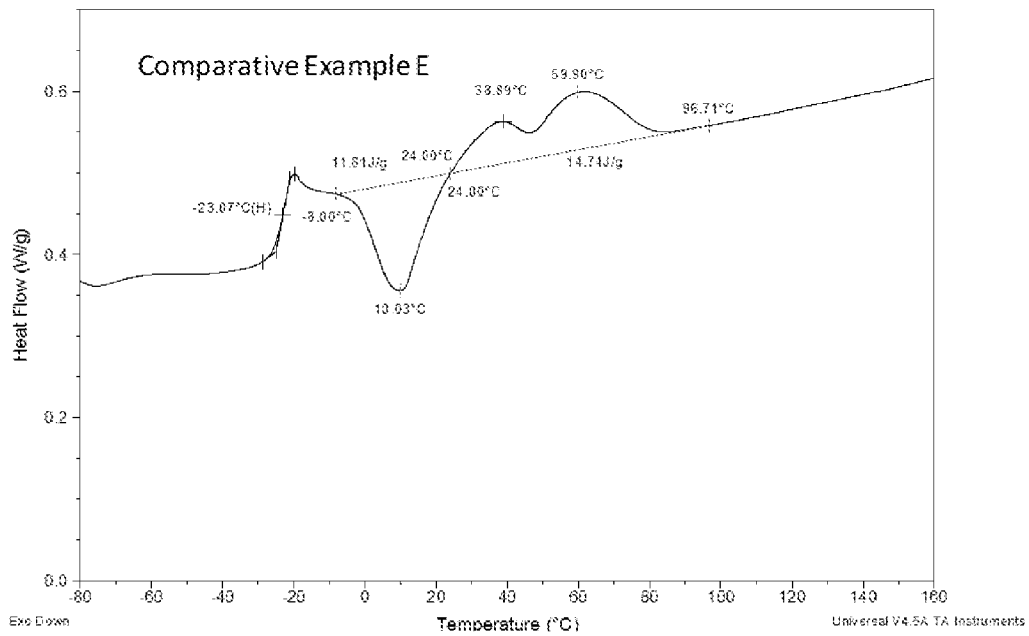
FIG. 7 is a set of two DSC profiles of Comparative Example E, i.e., a blend of Control 1 of FIG. 1 and Millad® NX® 8000 (a nucleator). The first DSC profile is that of the second heating and the second DSC profile is that of the first cooling.
Figure 7:
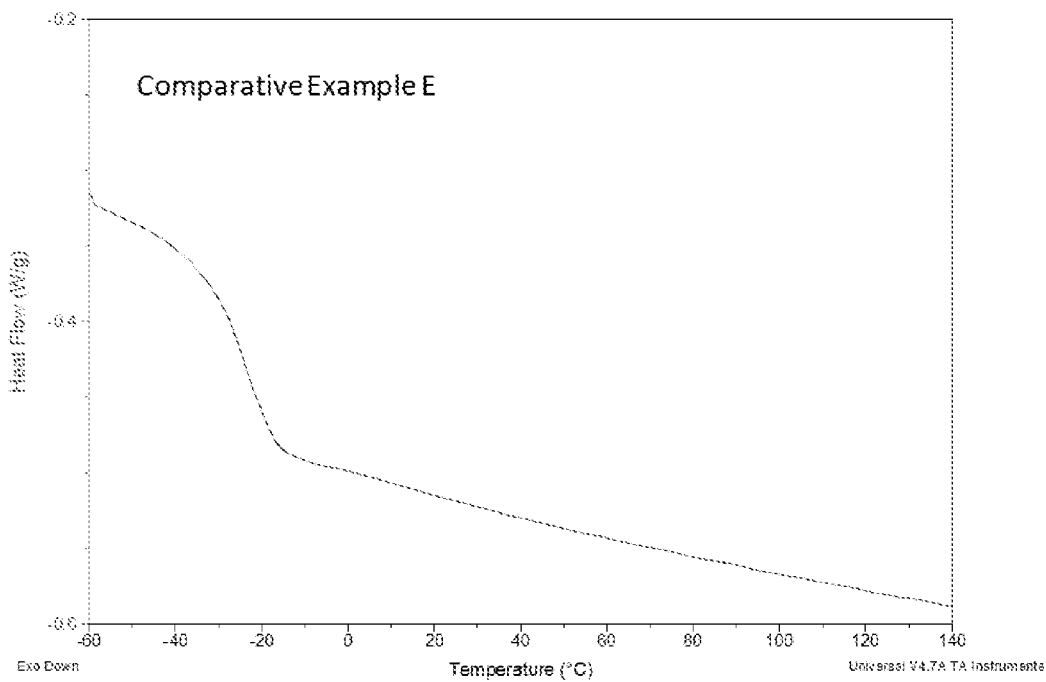

As can be seen in Table 9 and FIGS. 6 and 7, Comparative Examples D and E, respectively, both showed little to no evidence of any nucleation. For both examples, no cooling enthalpy is measured when cooled from the melt. A prominent secondary cooling curve upon reheating with a peak Tc of about 10° C. is seen for both comparative examples. Comparative Examples D and E showed secondary cooling enthalpies of about 11.6 and 11.8 J/g, respectively, upon reheating.

Figure 2:
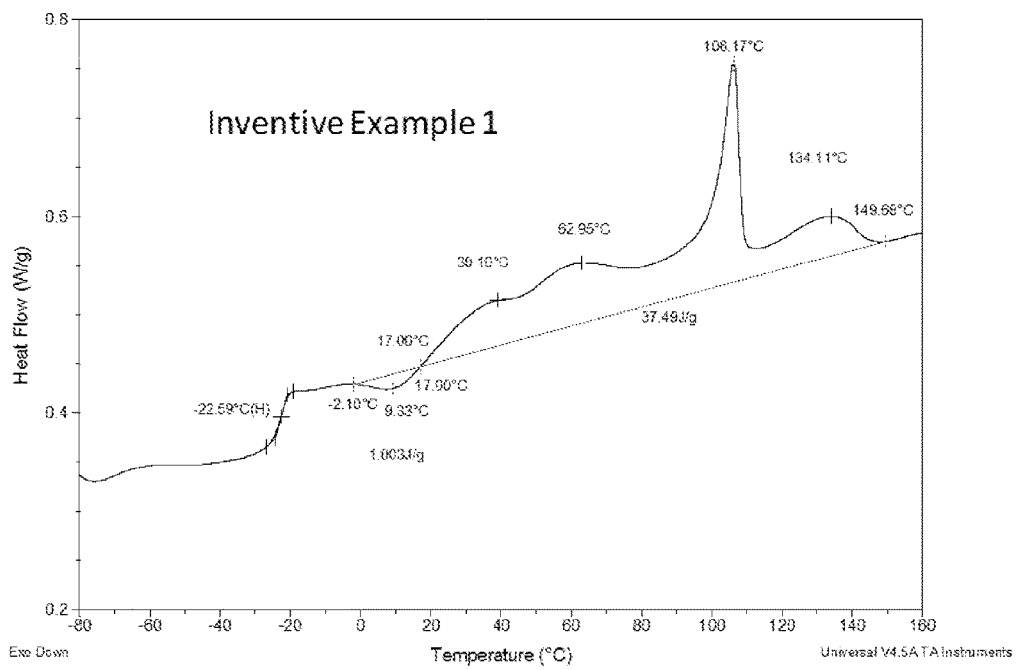
FIG. 2 is a set of two DSC profiles of Inventive Example 1, i.e., a blend of Control 1 of FIG. 1 and CBC1 in the Examples. The first DSC profile is that of the second heating and the second DSC profile is that of the first cooling.
Figure 2:
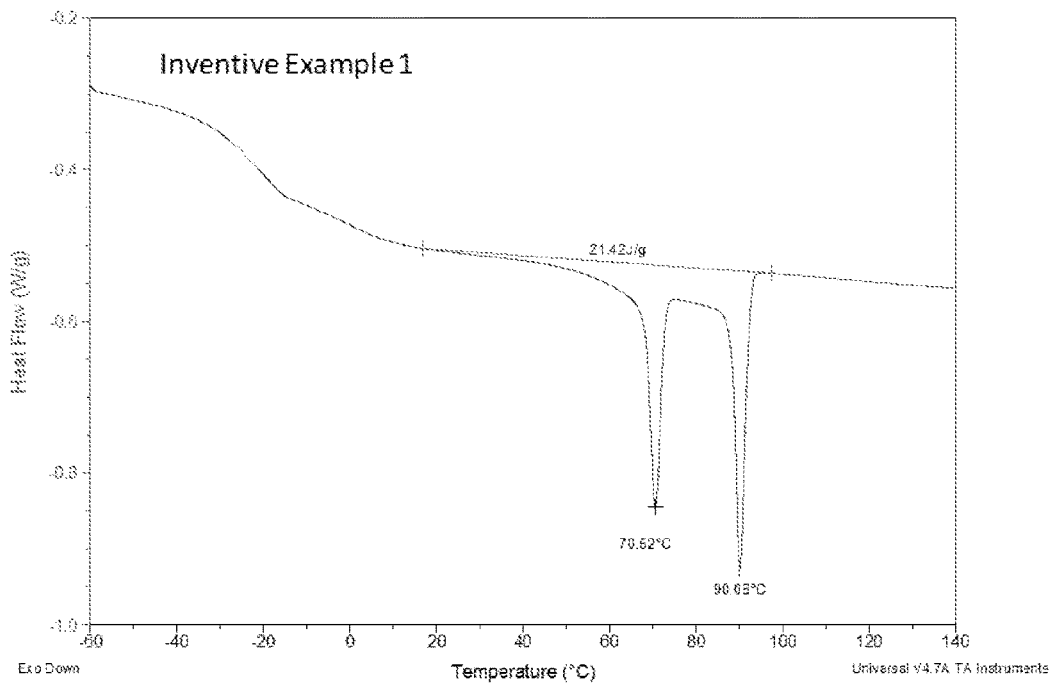

As can be seen in Table 9 and FIG. 2, Inventive Example 1 exhibited two sharp crystallization peak Tm's at about 90° C. and 70° C. The relatively high crystallization temperatures and sharp crystallization curves indicate that the crystallization rate of this composition is relatively fast. Upon reheating, a relatively small (e.g., very small) secondary cooling curve appears. The secondary cooling enthalpy is about 1 J/g, indicating that a substantial portion of the example has been nucleated and had undergone crystallization during the cooling cycle. Accordingly, the propylene-based interpolymer and crystalline block composite blends, according to exemplary embodiments for use in HMA compositions, may exhibit two sharp crystallization peak Tm's during a first cooling. For example, both of the sharp crystallization peak Tm's may be realized at two different temperatures from 50° C. to 150° C., from 60° C. to 120° C., and/or from 65° C. to 95° C. Further, upon a second heating, the propylene-based interpolymer and crystalline block composite blends, according to exemplary embodiments for use in HMA compositions, may exhibit a relatively small (e.g., less than 1.5 J/g and/or from 0 J/g and up to 1.5 J/g) secondary cooling curve, when melting at a rate of 10° C./min. Therefore, the propylene-based interpolymer and crystalline block composite blends, according to exemplary embodiments for use in HMA compositions, may act as an effective nucleator to speed up the crystallization of the propylene-based interpolymer (which may be a type of high comonomer content propylene copolymer, such as a propylene-octene copolymer having a conomoner content of 20 wt % to 30 wt %).

Materials for Hot Melt Adhesive Composition

Control 1 and Inventive 1 are further evaluated in hot melt adhesive compositions, in which the following additional materials are used:

Regalite™ R1090 Hydrocarbon Resin (Tackifier), which is believed to be a low molecular weight fully hydrogenated, water-white, inert, thermoplastic resin derived from petrochemical feedstocks (available from Eastman).

Shell Catenex Oil T 145 (Oil), which is believed to be a highly refined hydrotreated paraffinic process oil, which is virtually colourless and sulphur free, highly saturated, and free of aromatics and polar compounds (available from Shell).

Table 10 reports formulations for forming the Inventive HMA Composition using Inventive 1 from above and the Comparative HMA Composition using the Control 1 from above.

TABLE 10

| HMA Compositions | | |
| --- | --- | --- |
| | Inventive HMA Composition | Comparative HMA Composition |
| Formulation (wt %) | | |
| Control 1 | — | 59.5 |
| Inventive 1 | 59.5 | — |
| Tackifier | 28.3 | 30.0 |
| Oil | 15.0 | 10.0 |
| AO1 | 0.5 | 0.5 |
| Properties | | |
| Brookfield Viscosity (centipoise) | 7583 | 4263 |
| Dynamic Peel 5 gsm (N/25 mm) | 3.2 | 4.0 |
| Dynamic Peel 3 gsm (N/25 mm) | 2.6 | 2.8 |
| Dynamic Peel 2 gsm (N/25 mm) | 1.8 | 2.6 |

The HMA Compositions are prepared by using a one liter, Molteni mixer, in which two 600 gram batches of each HMA formulation are prepared. All the components (including the additional AO1) are pre-melted at 150° C. for a minimum of four hours, according to the formulations in Table 10, before mixing in the mixer. Two mixing stages are employed: (1) three minutes of mixing at 60 rpm, and (2) followed by seven minutes of mixing at 120 rpm. The set temperature for the regulator is 148° C.

The Brookfield viscosity is measured at 150° C. in accordance with ASTM D-3236, using a Brookfield RV-DV-II-Pro viscometer and spindle SC4-27.

For Dynamic Peel testing, laminate production is performed by preparing non-woven/back-sheet laminates using a NORDSON/JHT lab coater. Melting tank, transfer hose, and melt applicators are all set at 150° C. The "adhesive add on weights" are 2, 3 and 5 gsm (grams/square meter), and the resultants are indicated accordingly in Table 10. The melt pump rpm is kept constant at 27 rpm, and the line speed is typically 23, 16 and 10 m/min, to give the required coating weights of 2, 3 and 5 gsm, respectively. The lamination pressure is set at 1.5 bar. The slot coating die opening is perpendicular to the substrate, and positioned 4 cm below the mid-point of the rubber roll. The die is brought into contact with the substrate, giving a deflection of around 2 mm. A "12 gsm" hydrophobic PP non-woven, from FITESA, is used, along with a "16 gsm" breathable back-sheet from Clopay MicroPro™ FPS K-16M. Final laminate configuration is the following: PP non-woven/adhesive/back sheet.

For laminate adhesion testing, 25 mm×150 mm sized test samples are cut in the machine direction from the adhesive laminate. Adhesion, via the measurement of peel force, is tested using a 180° peel test configuration according to ISO 11339, with a separation rate of 300 mm/min. The average of five samples is recorded.

Referring to Table 10, above, it is seen that the Inventive HMA Composition demonstrates desirable Brookfield Viscosity and Dynamic Peel (at coating weights of each of 2 gsm, 3 gsm, and 5 gsm), relative to the Comparative HMA Composition. This data suggests that the addition of CBC1 in the Inventive HMA Composition may not interfere with the adhesion property in a hot melt adhesive formulation, while still acting as an effective nucleator.

Further, DSC thermal data of the Inventive and Comparative HMA Compositions are listed in Table 11, below.

TABLE 11

| | DSC Thermal Data | | | | | | | | | |
| --- | --- | --- | --- | --- | --- | --- | --- | --- | --- | --- |
| | Tm1 (° C.) | Delta Hm 1 (J/g) | Tm2 (° C.) | Delta Hm 2 (J/g) | Tc1 (° C.) | Delta Hc 1 (J/g) | Tc2 (° C.) | Delta Hc 2 (J/g) | Tc3 (° C.) | Delta Hc 3 (J/g) |
| Inventive HMA Composition | 101.2 | 6.14 | 121.7 | 1.54 | 85.2 | 4.71 | 74.8 | 2.87 | 59.4 | 1.31 |
| Comparative HMA Composition | Not present | Not present | Not present | Not present | Not present | Not present | Not present | Not present | Not present | Not present |

The Comparative HMA Composition does not show any crystallization and melting behavior upon the first cooling and the second heating. The Inventive HMA Composition exhibits multiple crystallization peaks upon first cooling and corresponding melting peaks upon second heating. These results demonstrate that addition of the CBC1 material is not only effective in nucleating P01, but also effective in nucleating P01 in a hot melt adhesive formulation. Accordingly, a crystalline block composite may be effective in nucleating a propylene-based interpolymer as discussed herewithin and effective in nucleating a hot melt adhesive formulation that includes both the crystalline block composite and the propylene-based interpolymer.

What is claimed is:

1. A hot melt adhesive composition, comprising:
   (A) 10-95 wt % of a random or homogeneous propylene-based interpolymer having:
      (i) a comonomer content of at least one of $C_2$ and $C_{4-10}$ α-olefin of 7 wt % to 49 wt % based on the total weight of the propylene-based interpolymer, (ii) an MWD of 4 or less, (iii) a density of 0.90 g/cc or less, and (iv) a Brookfield viscosity of less than 50,000 centipoise;
   (B) 1-60 wt % of a crystalline block composite comprising:
      (1) a crystalline ethylene based polymer;
      (2) a crystalline alpha-olefin based polymer derived from at least one of a $C_{3-10}$ α-olefin; and
      (3) a block copolymer comprising 10-90 wt % of a crystalline ethylene block comprising greater than 90 mol % units derived from ethylene and comprising 10-90 wt % of a crystalline alpha-olefin block comprising greater than 90 mol % units derived from at least one of a $C_{3-10}$ α-olefin;

(C) Optionally, from greater than zero to 70 wt % tackifier; and (D) Optionally, from greater than zero to 40 wt % of at least one selected from the group of a wax and an oil, wherein the hot melt adhesive composition exhibits a DSC secondary cooling enthalpy of 1.5 J/g or less when heated from above the glass transition temperature to complete composition melting at a rate of 10° C./min.

2. The hot melt adhesive composition as claimed in claim 1, wherein the crystalline alpha-olefin based polymer and the crystalline alpha-olefin block are derived from propylene.

3. The hot melt adhesive composition as claimed in claim 1, wherein the ratio of the propylene based interpolymer to crystalline block composite is from 95:5 to 50:50.

4. The hot melt adhesive composition as claimed in claim 1, wherein the Crystalline Block Composite Index of the crystalline block composite is greater than 0.2 and less than 1.0.

5. The hot melt adhesive composition as claimed in claim 1, wherein the comonomer content is from 15 wt % to 35 wt %, based on the total weight of the random or homogeneous propylene-based interpolymer.

6. The hot melt adhesive composition as claimed in claim 1, wherein the random or homogeneous propylene-based interpolymer is a propylene-octene copolymer.

7. The hot melt adhesive composition as claimed in claim 1, wherein the composition contains a crystallization nucleating agent.

8. The hot melt adhesive composition as claimed in claim 1, wherein the density of the random or homogeneous propylene-based interpolymer is from 0.85 g/cc to 0.89 g/cc.

* * * * *